(12) United States Patent
Zediker et al.

(10) Patent No.: US 9,085,050 B1
(45) Date of Patent: Jul. 21, 2015

(54) HIGH POWER LASER FLUID JETS AND BEAM PATHS USING DEUTERIUM OXIDE

(71) Applicants: Mark S. Zediker, Castle Rock, CO (US); Robert R. Rice, Simi Valley, CA (US); William F. Krupke, Pleasanton, CA (US); Brian O. Faircloth, Evergreen, CO (US)

(72) Inventors: Mark S. Zediker, Castle Rock, CO (US); Robert R. Rice, Simi Valley, CA (US); William F. Krupke, Pleasanton, CA (US); Brian O. Faircloth, Evergreen, CO (US)

(73) Assignee: Foro Energy, Inc., Littleton, CO (US)

(*) Notice: Subject to any disclaimer, the term of this patent is extended or adjusted under 35 U.S.C. 154(b) by 0 days.

(21) Appl. No.: 14/214,112

(22) Filed: Mar. 14, 2014

Related U.S. Application Data

(60) Provisional application No. 61/798,597, filed on Mar. 15, 2013.

(51) Int. Cl.
*E21B 7/14* (2006.01)
*B23K 26/38* (2014.01)
*E21B 29/02* (2006.01)
*E21B 41/00* (2006.01)
*E21B 43/11* (2006.01)

(52) U.S. Cl.
CPC .............. *B23K 26/381* (2013.01); *E21B 29/02* (2013.01); *E21B 41/00* (2013.01); *E21B 43/11* (2013.01)

(58) Field of Classification Search
USPC .............. 175/11, 16, 17; 285/224; 219/121.6, 219/121.84, 121.85
See application file for complete search history.

(56) References Cited

U.S. PATENT DOCUMENTS

| | | | |
|---|---|---|---|
| 4,199,034 A | | 4/1980 | Salisbury et al. |
| 4,330,761 A | * | 5/1982 | Cohn et al. .................. 372/4 |
| 4,410,051 A | | 10/1983 | Daniel et al. |
| 4,423,980 A | | 1/1984 | Warnock |
| 4,533,814 A | | 8/1985 | Ward |
| 4,637,478 A | | 1/1987 | George |
| 4,774,393 A | | 9/1988 | Tarumoto |
| 5,101,964 A | | 4/1992 | Westphal |
| 5,211,714 A | | 5/1993 | Jordan et al. |
| 5,308,951 A | | 5/1994 | Mori |
| 5,418,350 A | | 5/1995 | Freneaux et al. |
| 5,615,052 A | | 3/1997 | Doggett |
| 5,773,791 A | * | 6/1998 | Kuykendal ............. 219/121.84 |
| 5,813,465 A | | 9/1998 | Terrell et al. |
| 5,862,862 A | | 1/1999 | Terrell |
| 5,902,499 A | | 5/1999 | Richerzhagen |
| 5,909,306 A | | 6/1999 | Goldberg et al. |
| 5,938,954 A | | 8/1999 | Onuma et al. |

(Continued)

FOREIGN PATENT DOCUMENTS

| | | |
|---|---|---|
| GB | 1284454 | 8/1972 |
| WO | 2011/041390 | 4/2011 |

OTHER PUBLICATIONS

U.S. Appl. No. 14/213,212, filed Mar. 14, 2014, Zediker et al.

(Continued)

*Primary Examiner* — David Bagnell
*Assistant Examiner* — Ronald Runyan
(74) *Attorney, Agent, or Firm* — Glen P. Belvis; Steptoe & Johnson

(57) ABSTRACT

There are provided using deuterium oxide as a media for transmitting high power lasers to perform laser operations, such as cutting, boring and drilling, a target material. High power laser beams are transmitted through a deuterium oxide beam path to a target material, including material in a pressure containment vessel.

31 Claims, 13 Drawing Sheets

(56) References Cited

U.S. PATENT DOCUMENTS

| | | | |
|---|---|---|---|
| 6,180,913 B1 | 1/2001 | Kolmeder et al. | |
| 6,426,479 B1 | 7/2002 | Bischof | |
| 6,661,815 B1 | 12/2003 | Kozlovsky et al. | |
| 6,820,702 B2 | 11/2004 | Niedermayr et al. | |
| 7,223,935 B2 | 5/2007 | Wessner | |
| 7,365,285 B2 | 4/2008 | Toida | |
| 7,494,272 B2 | 2/2009 | Thomas et al. | |
| 7,646,794 B2 | 1/2010 | Sakurai et al. | |
| 7,843,633 B2 | 11/2010 | Nakamae et al. | |
| 7,883,325 B2 * | 2/2011 | Kheradvar et al. | 417/472 |
| 8,025,371 B1 | 9/2011 | Dean, Jr. | |
| 2002/0185474 A1 | 12/2002 | Dunsky et al. | |
| 2003/0000741 A1 | 1/2003 | Rosa | |
| 2003/0056990 A1 | 3/2003 | Oglesby | |
| 2003/0094281 A1 | 5/2003 | Tubel | |
| 2003/0132029 A1 | 7/2003 | Parker | |
| 2003/0174942 A1 | 9/2003 | Murshid et al. | |
| 2003/0226826 A1 | 12/2003 | Kobayashi et al. | |
| 2004/0026382 A1 | 2/2004 | Richerzhagen | |
| 2004/0112642 A1 | 6/2004 | Krueger et al. | |
| 2004/0195003 A1 | 10/2004 | Batarseh | |
| 2004/0206505 A1 | 10/2004 | Batarseh | |
| 2004/0244970 A1 | 12/2004 | Smith | |
| 2004/0256103 A1 | 12/2004 | Batarseh | |
| 2005/0007583 A1 | 1/2005 | DiFoggio | |
| 2005/0024743 A1 | 2/2005 | Camy-Peyret | |
| 2005/0034857 A1 | 2/2005 | Defretin et al. | |
| 2005/0115741 A1 | 6/2005 | Terry et al. | |
| 2005/0121235 A1 | 6/2005 | Larsen et al. | |
| 2005/0189146 A1 | 9/2005 | Oglesby | |
| 2005/0230107 A1 | 10/2005 | McDaniel et al. | |
| 2005/0263281 A1 | 12/2005 | Lovell et al. | |
| 2005/0263497 A1 | 12/2005 | Lehane et al. | |
| 2005/0269132 A1 | 12/2005 | Batarseh et al. | |
| 2006/0070770 A1 | 4/2006 | Marsh | |
| 2006/0102343 A1 | 5/2006 | Skinner et al. | |
| 2006/0102607 A1 | 5/2006 | Adams et al. | |
| 2006/0169677 A1 | 8/2006 | Deshi | |
| 2006/0185843 A1 | 8/2006 | Smith | |
| 2006/0191684 A1 | 8/2006 | Smith | |
| 2006/0207799 A1 | 9/2006 | Yu | |
| 2006/0231257 A1 | 10/2006 | Fuller et al. | |
| 2006/0237233 A1 | 10/2006 | Reed et al. | |
| 2006/0260832 A1 | 11/2006 | McKay | |
| 2006/0289724 A1 | 12/2006 | Skinner et al. | |
| 2007/0034409 A1 | 2/2007 | Dale et al. | |
| 2007/0193990 A1 | 8/2007 | Richerzhagen et al. | |
| 2007/0217736 A1 | 9/2007 | Zhang et al. | |
| 2007/0267220 A1 | 11/2007 | Magiawala et al. | |
| 2007/0278195 A1 | 12/2007 | Richerzhagen et al. | |
| 2008/0053702 A1 | 3/2008 | Smith | |
| 2008/0073077 A1 | 3/2008 | Tunc et al. | |
| 2008/0093125 A1 | 4/2008 | Potter et al. | |
| 2008/0124816 A1 | 5/2008 | Bruland et al. | |
| 2008/0166132 A1 | 7/2008 | Lynde | |
| 2008/0245568 A1 | 10/2008 | Jeffryes | |
| 2008/0314883 A1 | 12/2008 | Juodkazis et al. | |
| 2009/0045177 A1 | 2/2009 | Koseki et al. | |
| 2009/0078467 A1 | 3/2009 | Castillo | |
| 2009/0126235 A1 | 5/2009 | Kobayashi et al. | |
| 2009/0133871 A1 | 5/2009 | Skinner et al. | |
| 2009/0139768 A1 | 6/2009 | Castillo | |
| 2009/0166042 A1 | 7/2009 | Skinner | |
| 2009/0194292 A1 | 8/2009 | Oglesby | |
| 2010/0001179 A1 | 1/2010 | Kobayashi et al. | |
| 2010/0013663 A1 | 1/2010 | Cavender et al. | |
| 2010/0018703 A1 | 1/2010 | Lovell et al. | |
| 2010/0032207 A1 | 2/2010 | Potter et al. | |
| 2010/0044102 A1 | 2/2010 | Rinzler | |
| 2010/0044103 A1 | 2/2010 | Moxley | |
| 2010/0044104 A1 * | 2/2010 | Zediker et al. | 175/16 |
| 2010/0044105 A1 | 2/2010 | Faircloth | |
| 2010/0044106 A1 | 2/2010 | Zediker | |
| 2010/0078414 A1 | 4/2010 | Perry et al. | |
| 2010/0084132 A1 | 4/2010 | Noya et al. | |
| 2010/0089576 A1 | 4/2010 | Wideman et al. | |
| 2010/0187010 A1 | 7/2010 | Abbasi et al. | |
| 2010/0197116 A1 | 8/2010 | Shah et al. | |
| 2010/0215326 A1 | 8/2010 | Zediker | |
| 2010/0218993 A1 | 9/2010 | Wideman et al. | |
| 2010/0224408 A1 | 9/2010 | Kocis et al. | |
| 2010/0301027 A1 | 12/2010 | Sercel | |
| 2010/0326659 A1 | 12/2010 | Schultz et al. | |
| 2011/0079437 A1 | 4/2011 | Hopkins et al. | |
| 2011/0174537 A1 | 7/2011 | Potter et al. | |
| 2012/0020631 A1 | 1/2012 | Rinzler | |
| 2012/0067643 A1 | 3/2012 | Dewitt | |
| 2012/0068086 A1 | 3/2012 | Dewitt | |
| 2012/0074110 A1 | 3/2012 | Zediker | |
| 2012/0217015 A1 | 8/2012 | Zediker | |
| 2012/0217017 A1 | 8/2012 | Zediker | |
| 2012/0217018 A1 | 8/2012 | Zediker | |
| 2012/0217019 A1 | 8/2012 | Zediker | |
| 2012/0248078 A1 | 10/2012 | Zediker | |
| 2012/0255774 A1 | 10/2012 | Grubb | |
| 2012/0255933 A1 | 10/2012 | McKay | |
| 2012/0261188 A1 | 10/2012 | Zediker | |
| 2012/0266803 A1 | 10/2012 | Zediker | |
| 2012/0267168 A1 | 10/2012 | Grubb | |
| 2012/0273269 A1 | 11/2012 | Rinzler | |
| 2012/0273470 A1 | 11/2012 | Zediker | |
| 2012/0275159 A1 | 11/2012 | Fraze | |
| 2013/0011102 A1 | 1/2013 | Rinzler | |
| 2013/0175090 A1 | 7/2013 | Zediker | |
| 2013/0192893 A1 | 8/2013 | Zediker | |
| 2013/0192894 A1 | 8/2013 | Zediker | |
| 2013/0220626 A1 | 8/2013 | Zediker | |
| 2013/0228372 A1 | 9/2013 | Linyaev | |
| 2013/0228557 A1 | 9/2013 | Zediker | |
| 2013/0266031 A1 | 10/2013 | Norton | |
| 2013/0319984 A1 | 12/2013 | Linyaev | |
| 2014/0000902 A1 | 1/2014 | Wolfe | |
| 2014/0060802 A1 | 3/2014 | Zediker | |
| 2014/0060930 A1 | 3/2014 | Zediker | |
| 2014/0069896 A1 | 3/2014 | Deutch | |
| 2014/0090846 A1 | 4/2014 | Deutch | |
| 2014/0190949 A1 | 7/2014 | Zediker | |
| 2014/0231085 A1 | 8/2014 | Zediker | |
| 2014/0231398 A1 | 8/2014 | Land | |
| 2014/0248025 A1 | 9/2014 | Rinzler | |
| 2014/0345872 A1 | 11/2014 | Zediker | |

OTHER PUBLICATIONS

U.S. Appl. No. 14/105,949, filed Dec. 13, 2013, Deutch et al.
Muto, et al., "Laser cutting for thick concrete by multi-pass technique," *Chinese Optics Letters* May 31, 2007, vol. 5, pp. S39-S41.
International Search Report and the Written Opinion of the International Searching Authority, or the Declaration from PCT/US14/29375, mailed on Nov. 25, 2014.

* cited by examiner

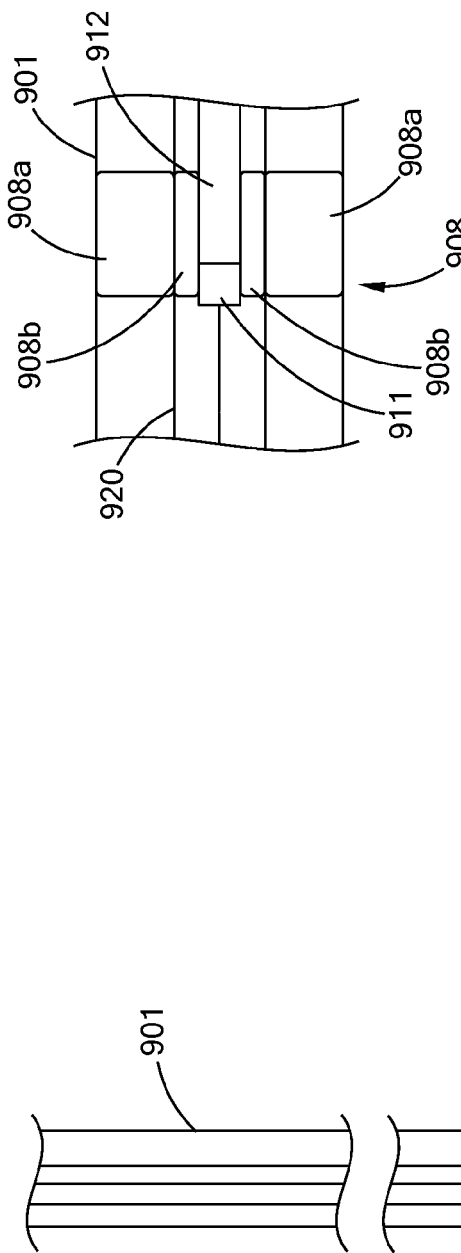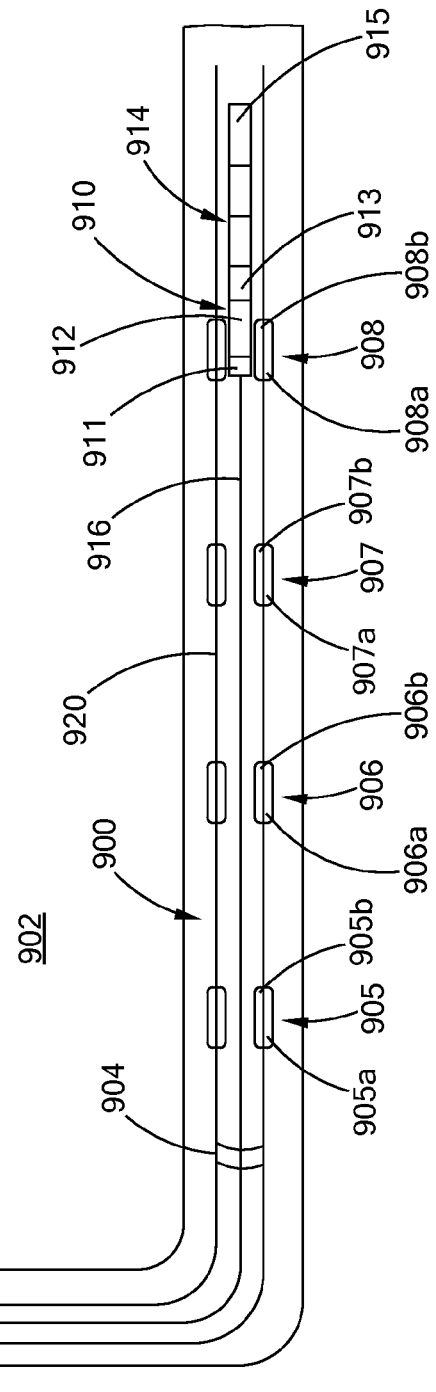
FIG. 3A
FIG. 3

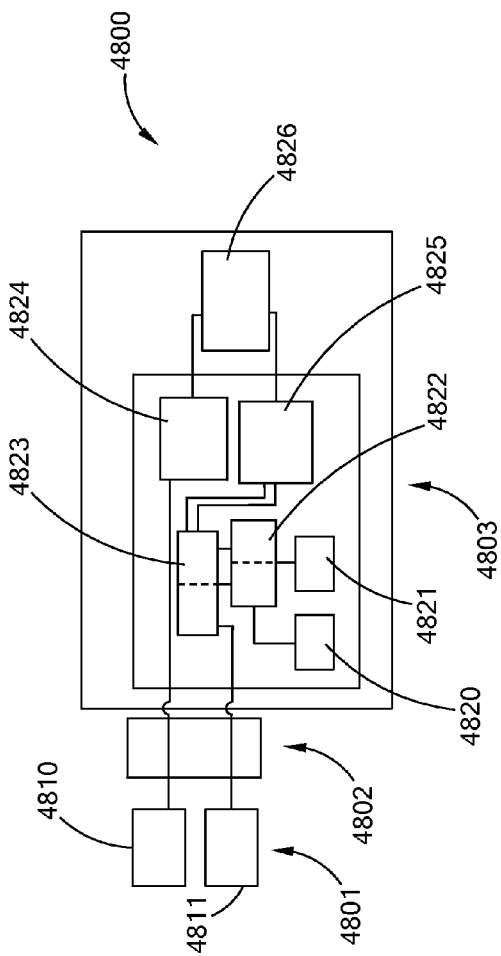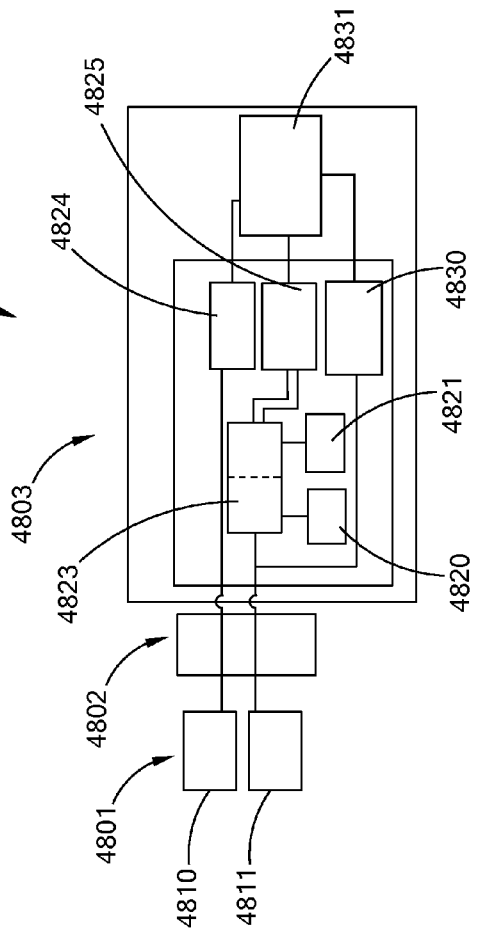

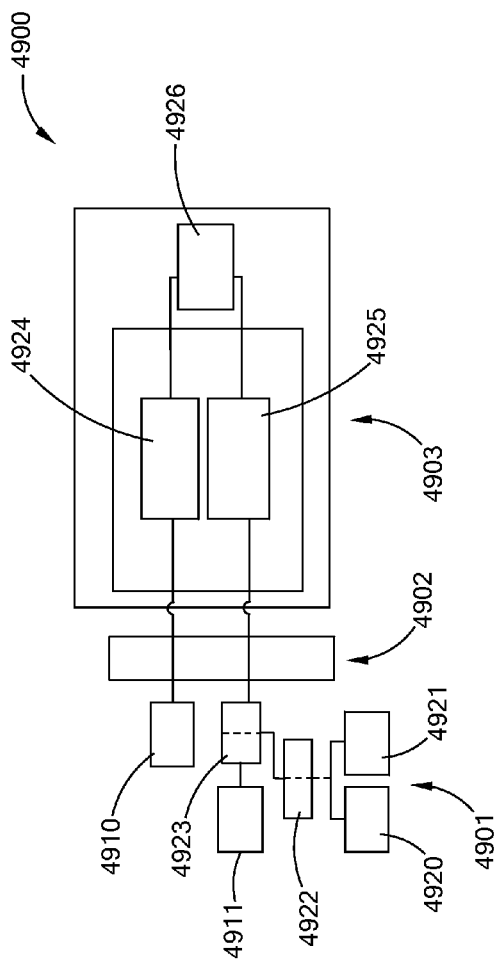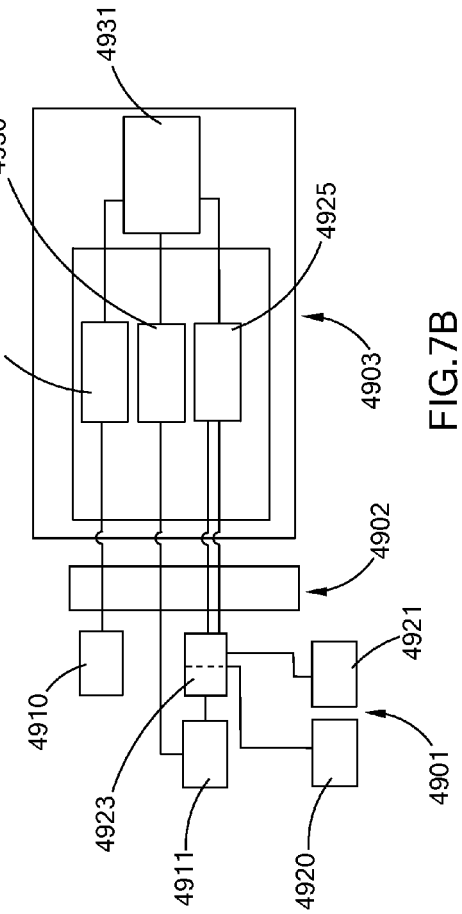

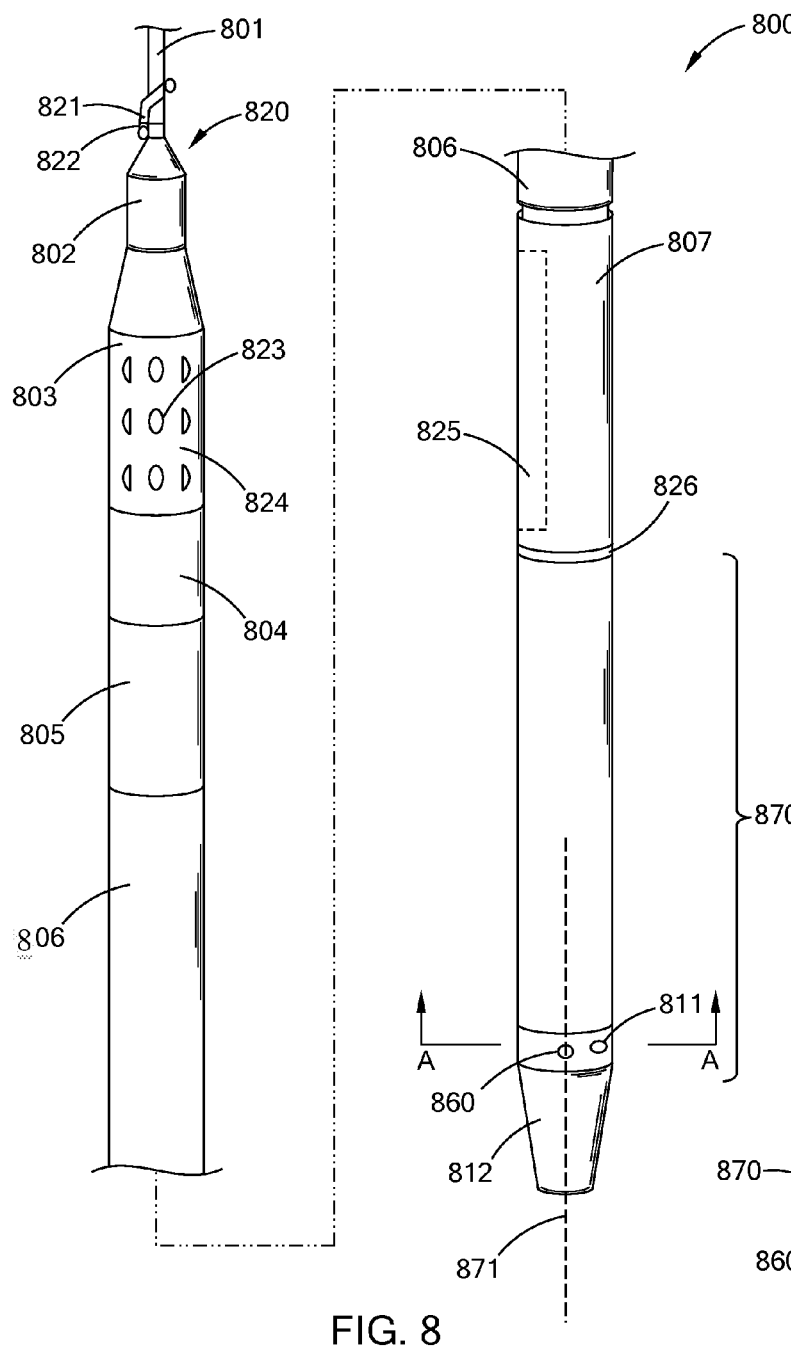
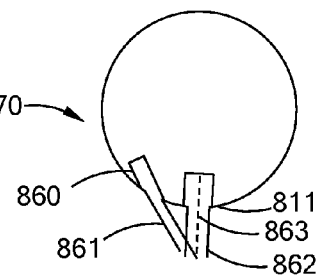
FIG. 8
FIG. 8A

HIGH POWER LASER FLUID JETS AND BEAM PATHS USING DEUTERIUM OXIDE

This application claims, under 35 U.S.C. §119(e)(1), the benefit of the filing date of Mar. 15, 2013, of provisional application Ser. No. 61/798,597, the entire disclosures of each of which are incorporated herein by reference.

BACKGROUND OF THE INVENTION

Field of the Invention

The present inventions relate to methods, apparatus and systems for the delivery of high power laser beams to a work surface and in particular work surfaces that are in remote, hazardous, optically occluded and difficult to access locations, such as: oil wells, boreholes in the earth, pipelines, underground mines, natural gas wells, geothermal wells, mining, subsea structures, pressure containment structures, pressure containment vessels, pressure containment housings, or nuclear reactors. The high power laser beams may be used at the delivered location for activities, such as, monitoring, welding, cladding, annealing, heating, cleaning, controlling, assembling, drilling, machining, powering equipment and cutting. Thus, the present invention relates to methods and apparatus for the delivery of a laser beam through the use of an isolated laser beam that is in a Deuterium oxide fluid jet that may for example be a single jet, a dual jet, or a more complex jet structure, in which the laser beam path(s) are in Deuterium oxide.

As used herein, unless specified otherwise "high power laser energy" means a laser beam having at least about 1 kW (kilowatt) of power. As used herein, unless specified otherwise "great distances" means at least about 500 m (meter). As used herein, unless specified otherwise, the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

SUMMARY

In using high power laser to perform laser operations, there has been a need to address, mitigate and control the environment and conditions along the optical path from the high power laser tool to the work piece or target surface for performing laser operations. The present inventions address these, and other needs, by providing the articles of manufacture, devices and processes taught herein.

Thus, there is provided a high power laser fluid jet nozzle assembly having: a body; the body comprising a laser fluid jet nozzle; a source of deuterium oxide in fluid communication with the nozzle for forming a deuterium oxide jet; and, the body comprising an optics assembly for delivering a high power laser beam along a laser beam path into the nozzle, whereby the laser beam path is in the deuterium oxide jet.

Still further there is provided the laser beam paths, laser fluid jets and methods of performing laser operations with $D_2O$ that include one or more of the following features: wherein the body is associated with a mechanical cutting device; wherein the mechanical cutting device comprises an iris; wherein the body is a part of a downhole tool; wherein the downhole tool is one of perforating tools, hydraulic fracturing tools, milling tools, window cutting tools or pipe cutting tools.

Moreover, there is provided a deuterium oxide laser beam transmission system, having, a volume of deuterium oxide; the volume defining a proximal end and a distal end and a length therebetween; the proximal end being in optical communication with a source of a high power laser beam; and the high power laser beam in the volume of deuterium oxide.

Yet additionally, there is provided the laser beam paths, laser fluid jets and methods of performing laser operations with $D_2O$ that include one or more the the following features: wherein the length of the fluid jet, $D_2O$ beam path, or $D_2O$ volume is greater than 10 inches, is less than 10 inches; wherein the deuterium oxide is flowing; wherein the deuterium oxide is a fluid jet; wherein the length of the jet is at least about 1 inch; wherein the jet is within a pressure containment cavity of a pressure containment vessel; wherein the volume of $D_2O$ is within a pressure containment cavity of a pressure containment vessel; wherein the laser beam has a wavelength that is less than about 1250 nm; and wherein the laser beam has a wavelength that is about 1070 nm.

Additionally there is provided a method of performing a high power laser operation on a target material, which includes: optically associating a high power laser tool with a source of a high power laser beam, whereby the laser tool can deliver a high power laser beam along a beam path; operationally associating the laser tool with a target martial; whereby the laser beam path is through a space partially defined by the laser beam tool to the target material; providing deuterium oxide in the space; and propagating the laser beam through deuterium oxide and striking the target material, wherein the intended laser operation is carried out on the target.

Still further there is provided the laser beam paths, laser fluid jets and methods of performing laser operations with $D_2O$ that include one or more of the following features: wherein the target material is a drilling pipe; wherein the target material is a tubular; wherein the space through which the laser beam path extends through the $D_2O$ is located within a pressure containment cavity of a pressure containment structure.

BRIEF DESCRIPTION OF THE DRAWINGS

FIG. 3 is a cross sectional view of an embodiment of a laser hydraulic fracturing assembly for use in accordance with the present inventions.

FIG. 3A is an enlarged cross sectional view of the packer assembly of the embodiment of FIG. 3 expanded in accordance with the present inventions.

FIG. 6A is schematic view of an embodiment of a laser tool for use in accordance with the present inventions.

FIG. 6B is schematic view of an embodiment of a laser tool for use in accordance with the present inventions.

FIG. 7A is schematic view of an embodiment of a laser tool for use in accordance with the present inventions.

FIG. 7B is schematic view of an embodiment of a laser tool for use in accordance with the present inventions.

FIG. 8 is perspective view of an embodiment of a laser tool for use in accordance with the present inventions.

FIG. 8A is cross sectional view of the embodiment of FIG. 8 as taken along line A-A of FIG. 8.

DESCRIPTION OF THE PREFERRED EMBODIMENTS

In general, the present inventions relate to systems, methods and tools for applying directed energy for cutting, heat treating, thermal processing, annealing, cladding, hard facing, welding and removing material; by way of an isolated laser beam that may be transmitted within a deuterium oxide ($D_2O$, "heavy water") laser beam path which preferably is provided by a fluid laser jet. Further, and in particular, these inventions relate to laser processing of objects located downhole in a borehole, associated with a borehole, or located under a body of water and would include, for example, the cutting, milling, perforating, and sectioning of such objects, including the perforating of boreholes into and through casing, cement and formations. These inventions still further relate to the advancing of boreholes in the earth, for example sandstone, limestone, basalt, salt, granite, shale, or the advancing of boreholes in other materials, that may or may not be found in the earth, such as for example concrete. The present inventions further relate to such methods and apparatus for laser assisted milling, cutting, flow assurance, decommissioning, plugging, abandonment and perforating activities in the exploration, production and development of natural resources, such as minerals, oil, gas and geothermal.

Deuterium oxide ($D_2O$) can be used in laser fluid jets as the laser carrying fluid, e.g., the fluid in the jet in which the laser is transmitted through. Depending upon the wavelength of the laser beam deuterium oxide will have substantially lower absorptivity, when compared to water ($H_2O$). Thus, for certain wavelengths, e.g., 1070 nm, and wavelength ranges, e.g., less than about 1250 nm, high power laser beams can be transmitted via a deuterium oxide laser jet with substantially lower power losses than in water. The work site may also be isolated, e.g., by a packer, and deuterium oxide used to displace the fluids between the laser tool and the work surface, (or fill that space) so that the laser beam can be shot through the deuterium oxide.

Figure 1A:
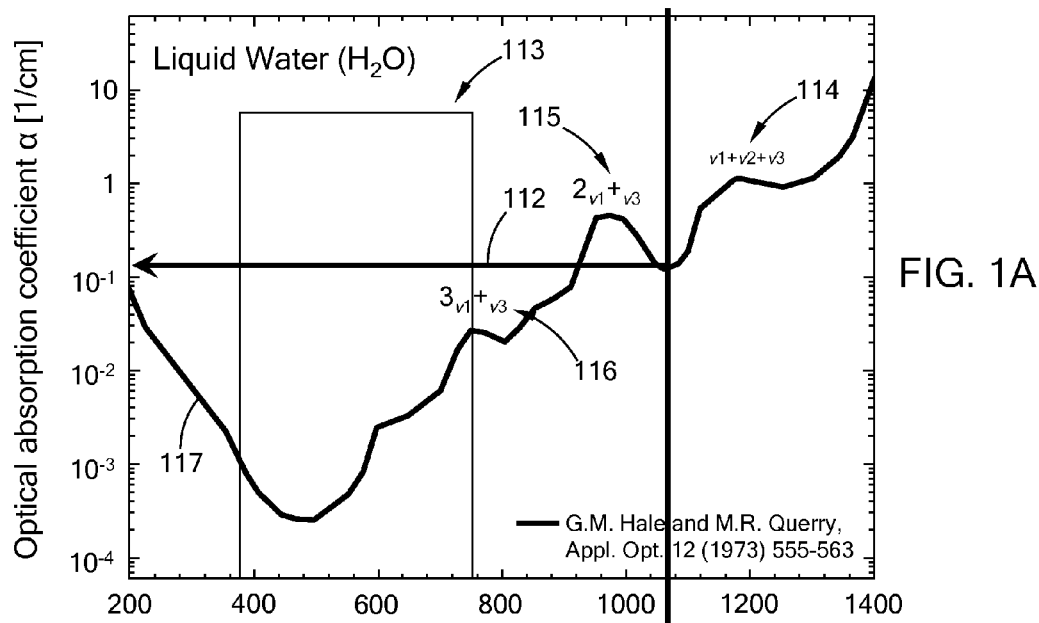
FIGS. 1A and 1B are graphs providing the absorption of water ($H_2O$) and Deuterium ($D_2O$) for particular wavelengths.
Figure 1B:
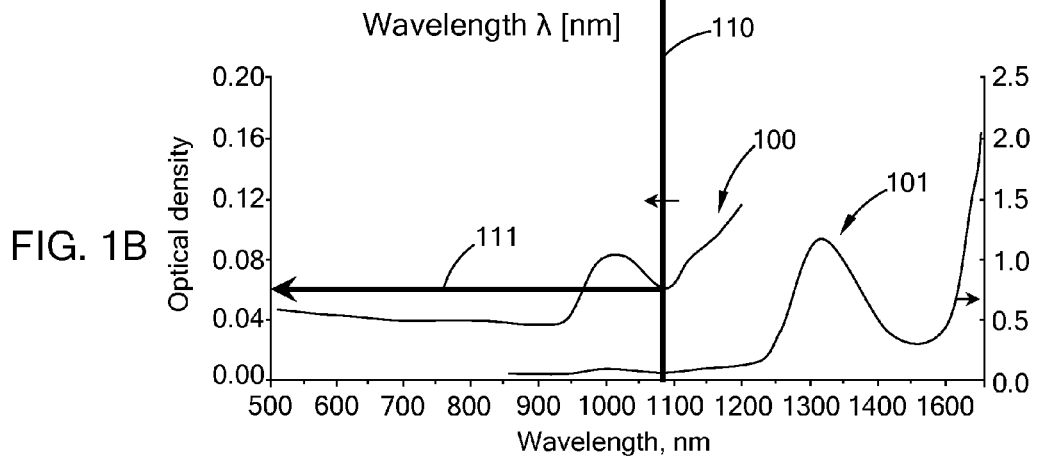

Turning to FIG. 1, and the graphs of FIGS. 1A and 1B, there is provided information about the absorption of $H_2O$ and $D_2O$. In FIG. 1A there is shown a detailed plot 117 of the absorption of $H_2O$ and the vibrational combinations, 114, 115, 116 that contribute to this absorption vs. wavelength. Area 113 shows the area and wavelengths where the power losses by transmission through water will be lowest. In FIG. 1B there is shown both the absorption plot of $H_2O$ 100 and for $D_2O$ 101, showing how the vibrational combinations are moved, shifted to the right to high wave lengths, and that in the less than about 1250 nm range, and in particular in the about 1150 nm and below range, the absorption of $D_2O$ is negligible compared to $H_2O$. Line 110 intersects both the graphs of FIG. 1A and FIG. 1B at 1070 nm. Arrows 111, 112 show the optical density for water at 1070 nm.

The significant improvement in the ability of laser beams, having wavelengths at or below 1250 nm, to be transmitted through $D_2O$ can can be explained, in part, based upon the vibrational modes that are present with water. (This theory is submitted by way of illustration and explanation. Applicant's are not bound by it, nor should it be used, or understood to narrow the scope of protection afforded the present inventions.) In the case of v1 and v3 there is the vibration between the O and H or O and D. In the case of v2 there is a bending of the $H_2O$ or $D_2O$ molecule. Looking at the reduced mass of the OH to the OD then it is possible to explain the shift of v1 and v3. Thus, using the reduced mass of the $H_2O$ to the $D_2O$ then the shift of v2 can be explained and better understood. This data is further set out in Table I.

TABLE I

|  | v1 | v2 | v3 | Units | 2v1 + v3 |  | v1 + v2 + v3 |  | 3v1 + v3 |  |
|---|---|---|---|---|---|---|---|---|---|---|
| H2O | 3400 | 1650 | 3500 | 1/cm | 10300 | 1/cm | 8550 | 1/cm | 13700 | 1/cm |
|  | 2.941176 | 6.060606 | 2.857143 | um | 0.970874 | um | 1.169591 | um | 0.729927 | um |
| D2O | 2475.339 | 1184.893 | 2548.143 | 1/cm | 7498.821 | 1/cm | 6208.375 | 1/cm | 9974.16 | 1/cm |
| 1/sqrt(1.998) | 4.039851 | 8.439578 | 3.924426 | um | 1.333543 | um | 1.610727 | um | 1.002591 | um |

Referring back to the spectral data, (e.g., FIG. 1) the 2v1+v3 absorption band at 0.97 um in $H_2O$ shifts to 1.33 um and the v1+v2+v3 absorption band at 1.17 um in $H_2O$ shifts to 1.61 um in $D_2O$. However the 3v1+v3 band edge moves into the 1.00 um range, but this is one of the weaker cross sections for absorption.

A test of this theory was performed and provided the significantly lower OD (optical density) that is present with $D_2O$ compared to water. In this test, and referring to absorption from the graphs of FIG. 1B, the following was determined:

Absorption coefficient of Water at 1.07 um: 0.11 cm−1 which corresponds to 24%/inch very close to the measured absorption of 22% in a test cell.

Absorption coefficient of $D_2O$ at 1.07 um: 0.02 OD after correcting for the 0.04 OD baseline of the cell, which corresponds to 1.2%/inch of absorption very close to the measured absorption of 1.5%/inch in a test cell.

In this test, to reduce or address errors that may have been introduced by the test cell several measures were taken. Time average methodologies were used to address changes in laser power over time as the laser is used. Speckle was also addressed via the handling of the data. In presenting and analyzing the data a best fit approach was used to estimate the absorption/loss coefficients for the two cases. Thus, the significantly lower OD for the transmission of a laser beam having a wavelength of about 1064 nm through a $D_2O$ laser beam path was established.

Thus, a laser beam having a wavelength of less than about 1250 nm, e.g., 1070 nm, will have a power loss of about less than 1.5%/inch when traveling through a $D_2O$ beam path. For example a 20 kW beam will have the powers set forth in Table II after traveling through a $D_2O$ beam path of a particular length.

TABLE II

| Input Laser beam power | Length of $D_2O$ path in inches | Laser beam power at end of $D_2O$ path |
| --- | --- | --- |
| 20 kW | 1 | 19.7 |
| 20 kW | 2 | 19.4 |
| 20 kW | 3 | 19.1 |
| 20 kW | 4 | 18.8 |
| 20 kW | 5 | 18.5 |
| 20 kW | 6 | 18.3 |
| 20 kW | 7 | 18.0 |
| 20 kW | 8 | 17.7 |
| 20 kW | 9 | 17.5 |
| 20 kW | 10 | 17.2 |

Thus, the present inventions relate to methods, apparatus and systems for the delivery of high power laser beams to a work surface, and in particular, a work surface that may be on a factory floor, in a pressure containment structure, system or vessel, may be in remote, hazardous, optically occluded and difficult to access locations, such as: oil wells, boreholes in the earth, pipelines, underground mines, natural gas wells, geothermal wells, surface mines, subsea, nuclear reactors, or in other environments.

The deuterium oxide laser jets may find applications in activities such as: off-shore activities; subsea activities; perforating; decommissioning structures such as, oil rigs, oil platforms, offshore platforms, factories, nuclear facilities, nuclear reactors, pipelines, bridges, etc.; cutting and removal of structures in refineries; civil engineering projects and construction and demolitions; concrete repair and removal; mining; surface mining; deep mining; rock and earth removal; surface mining; tunneling; making small diameter bores; oil field perforating; oil field fracking; well completion; window cutting; well decommissioning; well workover; precise and from a distance in-place milling and machining; heat treating; drilling and advancing boreholes; workover and completion; flow assurance; and, combinations and variations of these and other activities and operations.

The $D_2O$ may be used as a single laser jet or as the core in a compound laser jet having two, three, four or more annular flows. Examples of such laser jets and the nozzles and assemblies to deliver them are disclosed and taught in US Patent Application Publication No. 2012/0074110 the entire disclosure of which is incorporated herein by reference.

Various types of high power laser fluid jet nozzles and nozzle assemblies can be used. These nozzle assemblies have a housing that forms a body that contains the optical components and the fluid and laser beam merging components or area where the laser beam is launched into the $D_2O$ jet. The $D_2O$ is provided to the nozzle and therein forms a fluid laser jet. The nozzle assembly in general has an optics package or optics assembly that has lenses that shape the laser beam, and may also have a mirror, a prism, a pressure window, or other optical components. The nozzle and laser that form the $D_2O$ laser jet create a volume of $D_2O$ through which the laser beam is propagated. In the case of a laser jet, this volume would be, for example, cylindrical, or conical. This volume, e.g., a fluid jet in the shape of a cylinder, would have a proximal end that is closest to the laser, and into which the laser beam is launched and a distal end, which typically would be at the target material and from which the laser beam exits, or strikes the target to perform the laser operation on the target. In this manner the volume of $D_2O$ would be flowing as a jet. The volume of $D_2O$ forming the laser beam path may also be non-flowing; for example, the space between the laser tool and the target could be filled with $D_2O$ and the laser beam fired through it. The volume of $D_2O$ that forms the laser beam path may be any shape and could for example take the shape of the free space, or the volume of the free space, between the laser tool and the target. The volume of the $D_2O$ may have a length that provides a laser beam path having a length of 1 inch, 5 inches, 10 inches, 15 inches, or more.

A single high power laser may be utilized as source of laser energy for the deuterium oxide laser fluid jet and systems, or there may be two or three high power lasers, or more for one deuterium oxide laser fluid jet having a multi-laser system, or there may be several deuterium oxide laser fluid jet each having its own primary laser, and combinations and variations of these. High power solid-state lasers, specifically semiconductor lasers and fiber lasers are preferred, for the laser source, because of their short start up time and essentially instant-on capabilities. The high power lasers for example may be fiber lasers, disk lasers or semiconductor lasers having 5 kW, 10 kW, 20 kW, 50 kW, 80 kW or more power and, which emit laser beams with wavelengths in the range from about 405 nm (nanometers) to about 2100 nm, preferably in the range about 400 nm to about 1600 nm, about 400 nm to about 800 nm, 800 nm to about 1600 nm, about 1060 nm to 1080 nm, 1530 nm to 1600 nm, 1800 nm to 2100 nm, and more preferably about 1064 nm, about 1070-1080 nm, about 1360 nm, about 1455 nm, 1490 nm, or about 1550 nm, or about 1900 nm (wavelengths in the range of 1900 nm may be provided by Thulium lasers). For the use of D2O it is preferred that the wavelengths be about 1250 nm or less. An example of this general type of fiber laser is the IPG YLS-20000. The detailed properties of which are disclosed in US patent application Publication Number 2010/0044106. Thus, by way of example, there is contemplated the use of four, five, or six, 20 kW lasers to provide a laser beam having a power greater than about 60 kW, greater than about 70 kW, greater than about 80 kW, greater than about 90 kW and greater than about 100 kW. One laser may also be envisioned to provide these higher laser powers.

Examples

The following examples are provided to illustrate various devices, tools, configurations and activities that may be performed using the high power laser tools, devices and system of the present inventions. These examples are for illustrative purposes, and should not be viewed as, and do not otherwise limit the scope of the present inventions. Further, it should be understood that in some applications, for example for cost reasons, it may be advantageous to have the supply of $D_2O$ associated with or otherwise contained in the laser tool, in this manner the $D_2O$ use can be limited solely to laser operations, e.g., the $D_2O$ is only used to create a fluid path for the laser beam. Thus, in all of the following embodiments a $D_2O$ reservoir in the tool may be used. Further, this more limited use may be accomplished with fluid lines connection to a $D_2O$ source at the surface or other location removed from the tool.

Example 1

Figure 2:
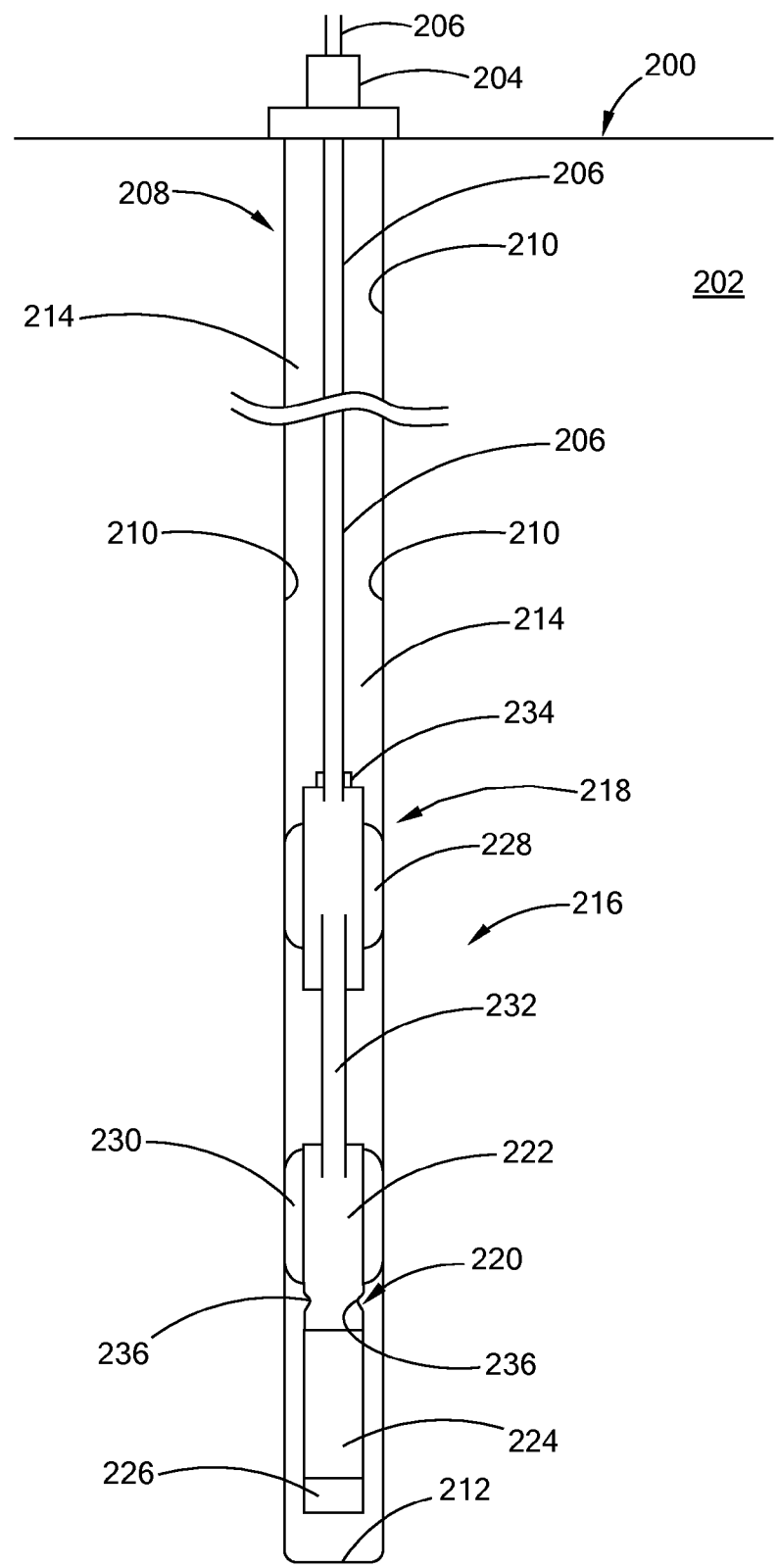
FIG. 2 is a schematic view of an embodiment of a dual packer downhole assembly for use in accordance with the present invention.

Turning to FIG. 2 there is shown an embodiment of a down hole laser tool, which can utilize a $D_2O$ laser path of the present invention. FIG. 2 illustrates an example of a laser bottom hole assembly ("LBHA") system in use in a borehole of the type taught and disclosed in US Patent Application Publication No. 2012/0067643, the entire disclosure of which is incorporated herein by reference. Thus, there is provided in the earth 202 a borehole 208. The borehole 208 has a sidewall surface 210 and a borehole bottom surface 212. At the surface 200 of the earth there is provided the top, or start of the borehole. At the surface 200 of the earth, there is provided a surface assembly 204, which may have a wellhead, a diverter, and a blow out preventer (BOP).

A conveyance device 206 is extended through the surface assembly 204 and into the borehole. For example, the conveyance devices can be coiled tubing, with tubes and lines contained therein, and thus a coiled tubing rig can be used with the conveyance device.

The conveyance device 206 extends down the borehole 208 and is attached to the LBHA 216 by attachment device 234. The attachment device can be any means suitable for the purpose; it can be permanent, temporary or releasable. It can be a weld, a threaded member and a nut, a quick disconnect, a collet, or other attachments devices that are known to the art.

The LBHA 216 has a first section 218 and a second section 220. The second section 220 of the LBHA has a first part 222 and a second part 224. A laser-mechanical bit 226 is positioned at the distal end of the second part 224 of the second section 220 of the LBHA 216. There is further provided an inflatable packer 228 on the first section 218 of the LBHA 216 and an inflatable packer 230 on the second section 220 of the LBHA 216.

The mechanical bit 226 may also be a laser cutting head for performing a down cutting, reaming, milling operation or any type of work over and completion activities.

As shown in FIG. 2 the packers are shown as inflated, thus they are shown as extending from the LBHA to and engaging the surface of the sidewall of the borehole. In this way the inflatable packers engage the surface of the borehole wall and seal against the wall, or form a seal against the wall. Further by sealing against the borehole wall the packers isolate the upper, i.e., the section of the borehole wall from the packer to the start of the well, from the section of the well below the packer, i.e. the section of the borehole wall from the packer to the bottom of the borehole. As shown in FIG. 2, the packer 228 is inflated against the wall and isolates and prevents the drilling fluid or drilling mud 214 contained in the borehole from advancing toward the second section 220 of the LBHA; or the bottom of the borehole 212; thus preventing the fluid from causing any potential interference with the laser beam or laser beam path.

The second or lower section 220 of the LBHA contains the laser optics that, for example, may form the beam profile and focus the beam, and the means for rotating the bit. The rotation means can be for example an electric motor or an air driven mud motor. Further, the lower section of the LBHA has ports or openings 236 for directing any waste or cuttings up the conveyance device to the surface.

The first 218 and second 220 sections of the LHBA 216 are connected by a piston 232. Thus, in use the packer 228 is inflated and in addition to forming a seal, fixes and holds the first section 218 in position in the borehole. The piston 232 is then advanced at a controlled rate and advances the second section 220 of the LBHA against the bottom of the borehole. In this way the borehole is advanced, as the piston is extended, and a high level of control can be maintained over rate-of-penetration (ROP), weight-on-bit (WOB) and revolutions-per-minute of the bit (RPM). Monitors and sensors can be located in the LBHA and connected to control devices at the surface by way of cables and/or fibers associated with the conveyance device.

When the piston has reached the end of its stroke, it is extended to its greatest practical length, the packer 230 is inflated, as shown in FIG. 2 and then the packer 228 is deflated, sufficiently so that the piston can be retracted and the upper or first section 218 is moved down toward the second section 220. The packer 228 is then inflated and the piston extended. This process is repeated, in an inch-worm like fashion advancing the well bore. Alternatively, the upper packer 228 can be a retractable cleat or other fixing apparatus that releasably attaches to or engages the borehole wall. In this case the lower packer remains inflated and is slid along the borehole wall surface, maintaining the seal and isolating the drilling mud above the lower section.

$D_2O$ is flowed down the conveyance means 206, through the upper section 218, the piston 232 and the lower section 224 and out the bit 216. The $D_2O$ also may be stored in a reservoir associated with the LBHA, a gas, water or other fluid may be used to remove waste or cuttings from the laser operation, with the $D_2O$ being limited to laser operations and to maintaining a laser beam bath through free space, and combinations and variations of these. The $D_2O$ after exiting the bit provides a laser beam jet and laser beam path for delivery of the laser beam, the $D_2O$ and potentially with a gas or fluid assist, carries the cuttings up the borehole, into the return ports 236 and up through the LBHA 216 and the conveyance device 206 to the surface, where the cuttings are handled in manners known to those skilled in the art. The gas must have sufficient flow rate and pressure to manage the borehole pressures and remove the cuttings.

The inflatable packers that are preferred have a tubular member and an inflatable bladder like structure that can be controllably inflated and deflated to fill the annulus between tubular member and the bore wall. Further, the pressure that the bladder exerts against the bore wall can be controlled and regulated. Control lines and lines for providing the media to inflate and deflate the bladder are associated, with or contained within, the conveyance device.

Further, the lower packer may be sealed, the sealed area filled with $D_2O$ to create a $D_2O$ laser beam path. Upon completion of the laser operation the $D_2O$ can be recovered and stored for cleaning and reuse, and the area of the laser operation washed with a different fluid, e.g., water, nitrogen, or air, to remove any waste materials.

Example 2

Turning to FIG. 3, there is shown an embodiment of a laser hydraulic fracturing assembly, which can utilize a $D_2O$ laser path of the present invention. The laser hydraulic fracturing assembly 900 is of the type disclosed and taught in U.S. patent application Ser. No. 14/082,026, the entire disclosure of which is incorporated herein by reference.

The laser hydraulic fracturing assembly 900 is attached by joint 904 to coil tubing 903. The coil tubing 903 has been used to lower the laser hydraulic fracturing assembly 900 into a desired position within the borehole 901, in formation 902. Positioned within assembly 900 is laser cutting or perforating tool 910. Laser perforating tool 910 may be moved into the borehole with assembly 900, or it may moved into position after assembly 900 is situated in the borehole.

Assembly 900 has a sleeve or outer housing 920, with a series of packer assemblies 905, 906, 907, 908, located along the length of the sleeve 920. In this embodiment packer assembly 908 would be the bottom most assembly, e.g., closest to the bottom of the borehole, and packer assembly 905 would be the upper most assembly, e.g., closes to the top of the borehole. More or less packer assemblies may be used on a laser hydraulic fracturing assembly. Each packer assembly has an outer expandable sealing member 905a, 906a, 907a, 908a, and an adjacent inner expandable sealing member 905b, 906b, 907b, 908b. These packer assemblies are spaced, e.g., positioned along the length of the sleeve 920 of the laser hydraulic fracturing assembly 900. They provide predetermined locations, sections or zones where laser perforations can be made. They also provide for the performance of flow and pressure operations, through the laser perforations, on these isolated sections of the borehole, such as for example, where fracturing fluid and pressures will be applied to the formation 902. Thus, their number, spacing and frequency can vary and will be determined, in part, by information regarding the nature and characteristics of the formation and hydrocarbon sought to be recovered.

The laser perforating tool 910 has a high pressure sealing section 911. This section is configured to seal against the laser conveyance structure 916, and be engaged by, and thus seal against the inner sealing member, e.g., 908b, when that sealing member is extended inwardly. In this manner the sealing section 911 when engaged by an inner sealing member protects the laser perforating tool 910 from any up hole conditions, such as for example, the pressures and flows from an hydraulic fracturing operation. The laser sealing section 911 may also have its own expandable device, which could be expanded to engage the inner sealing member 908b, or could be expanded to engage and seal against the inner wall of the sleeve 920, or even potentially against the inner wall of another tubular located around the laser tool. (In this manner, the position of the laser perforating tool 910 would not be limited to being adjacent a packer assembly, e.g., 908, during an hydraulic fracturing stage).

The laser perforating tool 910 has a laser cutter section 912, which may contain a laser optics package for shaping and determining the laser beam properties, a mirror or prism for changing the direction of the laser beam, and a beam steering assembly for scanning or otherwise directing the laser beam. For example, the cutter section may have a digital micromirror device ("DMD") to direct the laser beam in a predetermined path, to give rise to a predetermined volumetric removal. The laser cutter section 912 may also have a nozzle, jet or other components to assist in the delivery of the laser beam, along a predetermined laser beam path, to it is target, which jet or laser beam path is $D_2O$.

The laser cutter section 912 is optically associated with the conveyance structure 916, by for example, a high power connector. The conveyance structure 916 transmits the high power laser beam from a high power laser, preferably above the surface, to the cutting head section 912, where it is launch toward the target, e.g., the borehole wall. The conveyance structure 916 may be a high power optical fiber having a core diameter of at least about 300 microns, an inner protective sleeve of for example Teflon, which is located between the exterior of the optical fiber and the inner surface of a metal tube. The metal tube is then wrapped with carbon fiber, preferably in a braided fashion to provide strength to the metal tube and reduce, if not prevent the stretching of the tube. The woven carbon fiber outer wrap is then impregnated with an abrasion resistant resin or coating, which is also preferably high temperature, such as polyimide. The conveyance structure may also include other line structures for data, power, hydraulics for the the laser perforating tool 910, or these lines to the extent needed may be places in one or more other conveyance structures.

The laser perforating tool 910 has an instruments section 913, which may have position location equipment, logging equipment, sensors and the like. In particular and preferably, the instrument section 913 has a locator device that can detect and determine the position of the laser perforating tool 910 with respect to a packer assembly, e.g., 908.

The laser perforating tool, has a motive section 914, which may contain an axial extending device, such as a ball screw assembly, for moving the laser cutting head in a predetermined and controlled rate axially along the length of the borehole. Depending upon the laser beam steering capabilities of the laser cutter section 912, the laser motive section 914 may also have a rotation device for rotating the laser head to a particular orientation regarding the borehole (see, e.g., FIG. 4, item 1246).

The laser perforating tool 910 has a tractor section 915, which can be used to initially position the tool 910 in the coiled tubing, can be used to move the tool from one section of packer assemblies to the next, e.g., moving from packer assembly 908 to packer assembly 907. The tractor section 915 may also serve to anchor the tool 910 as the laser cutting head is moved during a laser perforating operation, and to anchor the tool 910 when the inner sealing members are sealed during a fracturing stage. Depending on the vertical slope of the borehole, the tractor section 915 may only be an anchoring section as the movement of the tool 910 in the borehole can be accomplished by gravity and the lowering or rising of the conveyance structure 916.

Once the desired laser perforations are made the laser cutter 912 is retracted back by the motive section 914, to the point where the sealing section 911 is adjacent to the inner packer 908b. At this point the inner packer 908b is sealed against the sealing section 911. The inner packer 908b and the sealing section 911 form a pressure tight seal. This seal has sufficient strength, e.g., is sufficiently tight and strong, to withstand the pressures and flows during e.g., a fracturing operation. The outer sealing member 908a of packer assembly 908 and the outer sealing member 907a of packer assembly 907 are then extended to seal against the inner surface of the borehole 901. In this manner the packer assembly 908, in conjunction with sealing section 911 form a plug in the borehole, as shown in FIG. 3A. Further, in this manner packer assemblies 907 and 908 form an isolation zone along the length of the borehole.

Once the packers sealing members 907a, 908a, and 908b are set, hydraulic fracturing can begin. The fracturing fluid is pumped down the coiled tubing 903, into the sleeve 920, out of the sleeve through the laser cut openings, and into the laser perforations in the formation fracturing the formation.

As the pressures and flows are monitored, if it is believed that less than optimal fracturing is occurring, the pressure and flow of the fracturing fluid can be reduced and stopped. The packer 908b can be disengaged, and subsequent laser cutting, and perforating operations, can be commented in the section between packer assembly 908 and 907. Once the subsequent, adaptive, laser perforation is completed, the cutter head 912 is retracted, the inner seal 908b is set, and the hydraulic fracturing can be continued. In this manner, real time monitoring and adaptive perforation of the well can be performed to optimize the hydraulic fracturing operation. (It should also be noted that these seals can be used to control the beam path free space environment, by for example, filling the free space with $D_2O$, which is preferred if the laser wavelength is about 1070 nm, or with a different fluid that is selected to provide minimal transmission losses to a particular laser beam wave length.)

Example 3

Figure 4:
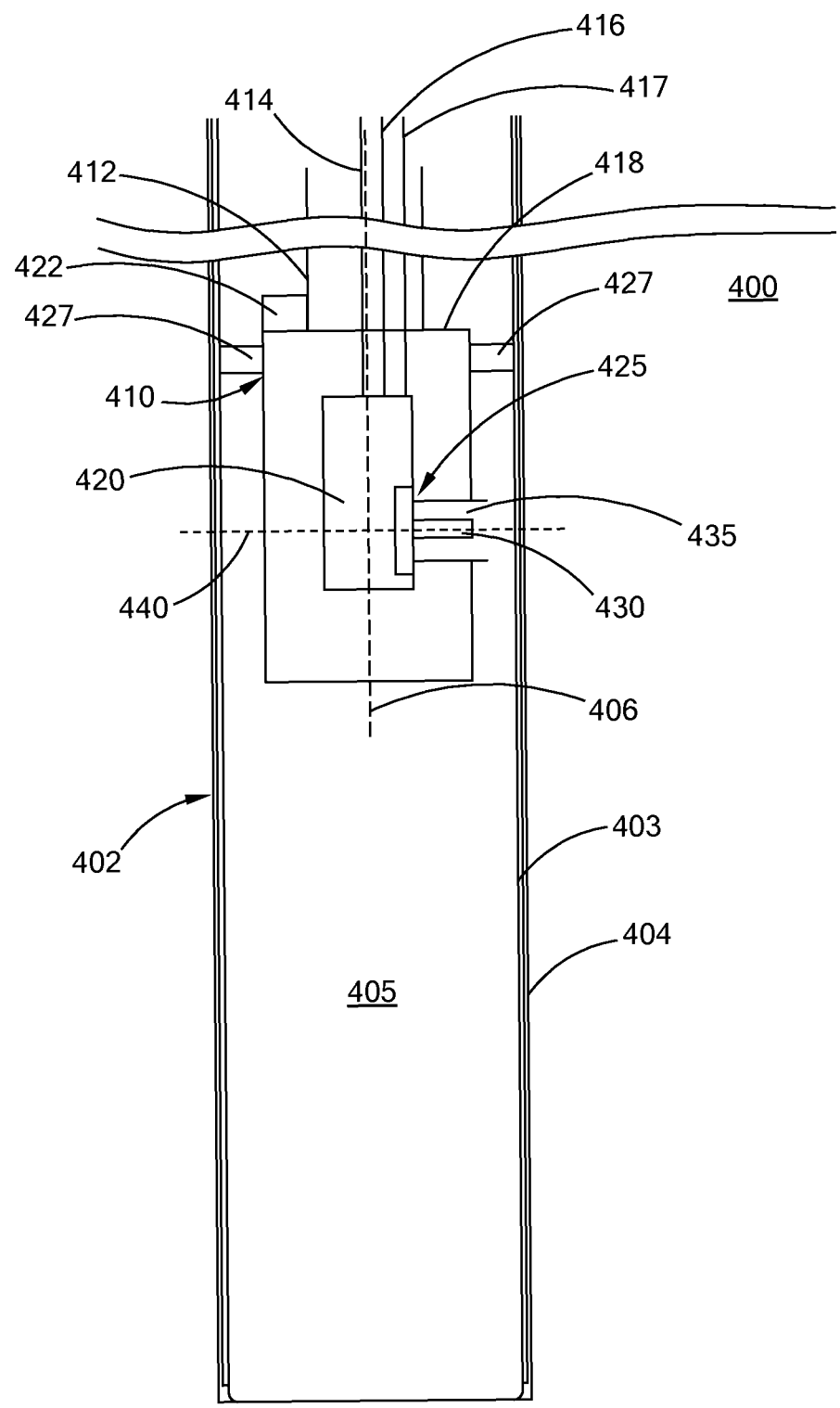
FIG. 4 is a schematic view of an embodiment of a laser tool for use in accordance with the present invention.

Turning to FIG. 4 there is shown an embodiment of a laser tool, which can utilize a $D_2O$ laser path of the present invention. In FIG. 4 there is provided an illustration of an embodiment of a system for providing a laser compound fluid jet, of the type that is disclosed and taught in US Patent Publication No. 2012/0074110, the entire disclosure of which is incorporated herein by reference.

Thus, there is shown a formation 400 in which there is a borehole 402, having a casing 403 and cement 404. The borehole 402 contains a borehole fluid 405, such as a drilling fluid, that is substantially non-transmissive to the laser beam, that is generated by a laser, which is not shown in the figure. There is provided in FIG. 4 a laser tool 410 that is connected to a conveyance means 412, which in this illustration is coiled tubing, but could also be a composite tube, wireline, slick line, or conventional drill pipe. The conveyance means 412 has associated with it an optical fiber 414, which preferably can be an optical fiber of the type discussed above. The conveyance means 412 has associated with it a first fluid line 416, a second fluid line 417. The conveyance means 412 is connected to a laser tool housing 418. The optical fiber 412 is in optical communication and optically associated with the laser tool 410, the laser tool housing 418, and in particular the optical components in those structures. The first and second fluid lines 416 and 417 are in fluid communication with and are fluidly associated with the laser tool 410, the laser tool housing 418 and in particular the components used to create the fluid jets. The laser tool 410 also has positioning and holding devices 427 to maintain the position of the laser tool, determine the position of the laser tool, controllably advance or move the position of the laser tool or all of the forgoing. This device may be connected to a surface control unit, power unit by cables, such as optical, data, electrical, hydraulic, or the like.

There is provided in FIG. 4 an assembly 420 that has the optical components for focusing and delivering the laser beam to a target, the nozzle assemblies for creating the core and annular jet or jets, as well as, the components of these assemblies that launch or place the laser beam within the core jet. These components can be associated in a separate assembly, a housing, or can be positioned within the laser tool housing, or the laser tool, with or without the use of a separate housing, or additional structures, or housings. There is provided a nozzle 425 having an inner nozzle 430 for forming the core jet, e.g., the $D_2O$ jet, having the laser beam and an outer nozzle 435 for forming an annular jet that surrounds the $D_2O$ jet. There is further shown in FIG. 4 the centerline 406 of the borehole 402 and the jet axis 440 of the composite laser jet that will be formed by the nozzle and optics. The laser beam, the $D_2O$ jet and the annular jet will be coaxial with this jet axis 440.

There is further provided in the embodiment shown in the FIG. 4 a box 422, which is a schematic representation for logging, measuring, or analyzing equipment or tools that may be associated with the laser tool 410. Such tools 422 may be operationally associated with the positioning and holding device 427, either directly downhole, or through a control systems on the surface. Although shown as a box for the simplicity and clarity of the figure, these tools 422 are more complex, can be much larger, and may be located above, below or both with respect to laser tool.

Example 4

Figure 5:
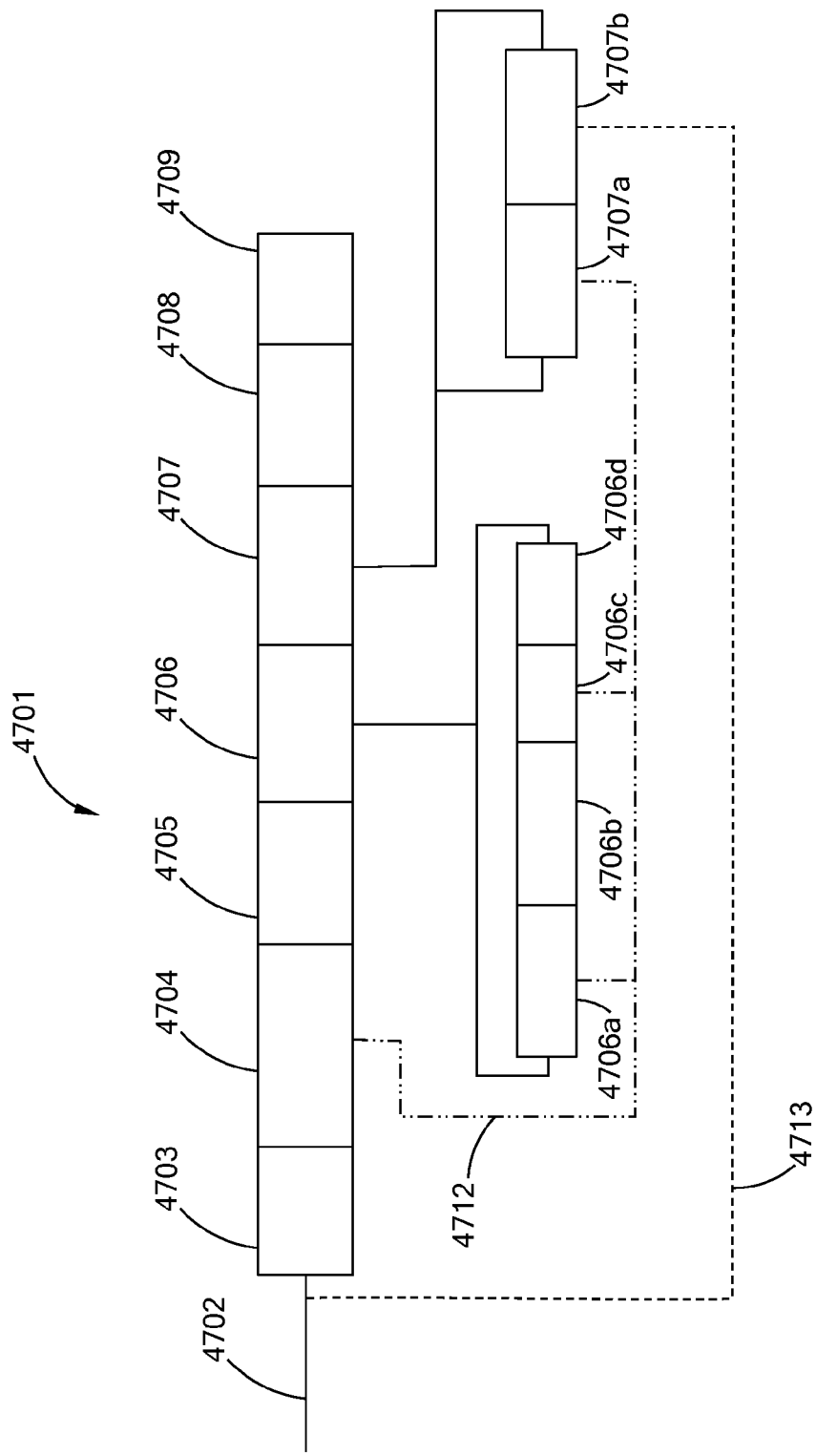
FIG. 5 is schematic view of an embodiment of a laser tool for use in accordance with the present inventions.

Turning to FIG. 5 there is provided a schematic of an embodiment of a laser tool, which can utilize the $D_2O$ beam path of the present invention. FIG. 5 provides a schematic of an embodiment of a laser tool of the type taught and disclosed in U.S. patent application Ser. No. 13/782,869, the entire disclosure of which is incorporated herein by reference.

The laser tool 4701 has a conveyance structure 4702, which may have an E-line, a high power laser fiber, and a fluid pathway. The conveyance structure 4702 connects to the cable/tube termination section 4703. The tool 4701 also has an electronics cartridge 4704, an anchor section 4705, a hydraulic section 4706, an optics/cutting section (e.g., optics and laser head) 4707, a second or lower anchor section 4708, and a lower head 4709. The electronics cartridge 4704 may have a communications point with the tool for providing data transmission from sensors in the tool to the surface, for data processing from sensors, from control signals or both, and for receiving control signals or control information from the surface for operating the tool or the tools components. The anchor sections 4705, 4708 may be, for example, a hydraulically activated mechanism that contacts and applies force to the borehole. The lower head section 4709 may include a junk collection device, or a sensor package or other down hole equipment. The hydraulic section 4706 has an electric motor 4706a, a hydraulic pump 4606b, a hydraulic block 4706c, and an anchoring reservoir 4706d. The optics/cutting section 4707 has a swivel motor 4707a and a laser head section 4707b. Further, the motors 4704a and 4706a may be a single motor that has power transmitted to each section by shafts, which are controlled by a switch or clutch mechanism. The flow path for the $D_2O$ to form the fluid jet is schematically shown by line 4713. The path for electrical power is schematically shown by line 4712. The laser head section 4707b preferably may have any of the laser fluid jet heads provided in references incorporated into this specification by reference.

Example 5

Turning to FIGS. 6A and 6B there are provided schematics of embodiments of laser tools, which can utilize the $D_2O$ beam path of the present invention. Turning to FIGS. 6A and 6B there are provided schematics of embodiments of laser tools of the type taught and disclosed in U.S. patent application Ser. No. 13/782,869, the entire disclosure of which is incorporated herein by reference.

FIGS. 6A and 6B show schematic layouts for perforating and cutting systems using, a two fluid dual annular laser jet, in which the center or core jet is a $D_2O$ jet. Thus, there is an uphole section 4801 of the system 4800 that is located above the surface of the earth, or outside of the borehole. There is a conveyance section 4802, which operably associates the uphole section 4801 with the downhole section 4803. The uphole section has a high power laser unit 4810 and a power supply 4811. In this embodiment the conveyance section 4802 is a tube, a bunched cable, or umbilical having two fluid lines and a high power optical fiber. In the embodiment of FIG. 6A the downhole section has a first fluid source 4820, e.g., having a predetermined index of refraction, and a second fluid source 4821, i.e., $D_2O$. The fluids are fed into a dual reservoir 4822 (the fluids are not mixed and are kept separate as indicated by the dashed line), which may be pressurized and which feeds dual pumps 4823 (the fluids are not mixed and are kept separate as indicated by the dashed line). In operation the two fluids 4820, 4821 are pumped to the dual fluid jet nozzle 4825 to form an annular laser jet 4826. The high power laser beam, along a beam path enters the optics 4824, is shaped to a predetermined profile, and delivered into the dual fluid jet nozzle 4825. In the embodiment of FIG. 6B a control head motor 4830 has been added and controlled motion laser jet 4831 has been employed in place of the annular laser jet 4826.

Example 6

Turning to FIGS. 7A and 7B there are provided schematics of embodiments of laser tools, which can utilize the $D_2O$ beam path of the present invention. Turning to FIGS. 7A and 7B there are provided schematics of embodiments of laser tools of the type taught and disclosed in U.S. patent application Ser. No. 13/782,869, the entire disclosure of which is incorporated herein by reference.

Turning to FIGS. 7A and 7B there is shown schematic layouts for cutting and perforating systems using a two fluid dual annular $D_2O$ laser jet, with the $D_2O$ forming the inner or core jet. Thus, there is an uphole section 4901 of the system 4900 that is located above the surface of the earth, or outside of the borehole. There is a conveyance section 4902, which operably associates the uphole section 4901 with the downhole section 4903. The uphole section has a high power laser unit 4910 and a power supply 4911 and has a first fluid source 4920, e.g., a gas or liquid, and a second fluid source 4921, e.g., a liquid having a predetermined index of refraction. The fluids are fed into a dual reservoir 4922 (the fluids are not mixed and are kept separate as indicated by the dashed line), which may be pressurized and which feeds dual pumps 4923 (the fluids are not mixed and are kept separate as indicated by the dashed line). In operation the two fluids 4920, 4921 are pumped through the conveyance section 4902 to the downhole section 4903 and into the dual fluid jet nozzle 4925. In this embodiment the conveyance section 4902 is a tube, a bunched cable, or umbilical. For FIG. 7A the conveyance section 4902 would have two fluid lines and a high power optical fiber In the embodiment of FIG. 7B the conveyance section 4902 would have two fluid lines, an electric line and a high power optical fiber. In the embodiment of FIG. 7A the downhole section has an optics assembly 4924 and a nozzle 4925. The high power laser beam, along a beam path enters the optics 4924, where it may be shaped to a predetermined profile, and delivered into the nozzle 4925. In the embodiment of FIG. 7B a control head motor 4930 has been added and controlled motion laser jet 4931 has been employed in place of the annular laser jet 4926. Additionally, the reservoir 4922 may not be used as shown in the embodiment of FIG. 7B.

Example 7

Turning to FIGS. 8 and 8A there is provided a prospective view and a cross sectional view of an embodiment of a laser tool, which can utilize the $D_2O$ beam path of the present invention. Turning to FIGS. 8 and 8A there is shown an embodiment of laser tool of the type taught and disclosed in U.S. patent application Ser. No. 13/782,869, the entire disclosure of which is incorporated herein by reference.

Turning to FIG. 8 there is provided a perspective view of an embodiment of a laser perforating tool with a conveyance structure attached. The laser perforating tool 800 contains several connectable and cooperatively operable subassemblies forming an elongated housing that may be joined together by threaded unions, or other connecting means know to the art, into an operable piece of equipment for use. At the top 820 of tool 800 is a conveyance structure 801, which is mounted with the tool 800 at a cable head 802. A guide assembly 821 is mounted around conveyance structure 801 immediately above cable head 802. Housing guide assembly 821 is freely rotatedly mounted around the conveyance structure 801 and provided with a roller or wheel and a sliding shoe or guide portion 822 which enables the tool to be pulled into a reduced diameter aperture such as when the tool is pulled from a lower portion of well casing through a bulkhead or the like into a shorter tubing string. Guide assembly 821 prevents the the upper end portion of cable head 802 from becoming stuck or wedged against the obstruction created by a reduced diameter aperture within a well casing. Adjacent cable head 802 is upper roller assembly 803. Upper roller assembly 803 contains a number of individual rollers, e.g., 823 mounted in a space relation around and longitudinally along this section. Rollers 823 protrude from the outer surface 824 of the upper roller assembly housing in order to support the housing on the interior tubular surface presented by well casing and tubing. Rollers 823 in this roller assembly can be constructed with low friction bearings and/or materials so that rotation of the rollers requires very little force, other devices for reducing the force required for movement through the borehole, known to those of skill in the art may also be used. This construction assists in longitudinal movement of the housing through the tubing and casing of a well by significantly reducing the force required to accomplish such movement. Below upper roller assembly 803 is a connecting segment 804 which joins a casing collar locator 805. Casing collar locator 805 is used to locate the collars within a casing of a well. In perforating operations it is typical to locate several collars within a well in order to determine the exact position of the zone of interest that is to be perforated, other instruments and assemblies may also be used to make this determination.

With explosive perforation it was necessary or suggested to locate collars within the casing in order to position the explosive perforating tool such that it would not attempt to perforate the casing through a collar. The laser perforating tools have overcome this problem and restriction. The laser beam and laser cutting heads can readily cut a perforation hole through a casing collar or joint of any size.

Immediately below casing collar locator 805 is a swivel sub 806. Swivel sub 806 is constructed with overlapping internal and external members that provide for a rigid longitudinal connection between upper and lower portions of the housing while at the same time providing for free rotational movement between adjoining upper and lower portions of the housing.

Immediately below swivel sub 806 in the housing is an eccentrically weighted sub 807, which provides for passive vertical orientation, positioning, of the laser sub assembly 870. Eccentric weight sub 807 contains a substantially dense weight, e.g., depleted uranium, that is positioned in an eccentric relation to the longitudinal axis of the housing. This eccentric weight 825 is illustrated in dashed lines in its eccentric position relative to the longitudinal axis of this sub. The position of eccentric weight 825 is on what will be referred to as the bottom portion of the housing and the laser sub 870. Due to the mass of weight 825 being selected as substantially larger than the mass of the adjacent portion of the apparatus housing this weight will cause the housing to rotate to an orientation placing weight 825 in a downwardly oriented direction. This is facilitated by the presence of swivel sub 806. Immediately below eccentric weight sub 807 is an alignment joint sub indicated at 826. Alignment joint 826 is used to correctly connect eccentric weight sub 807 with the laser sub 870 so that the bottom portion of the housing will be in alignment with the laser beam aiming and directing systems in the laser sub 870.

Laser sub assembly 870 contains several components within its housing 808. These components or assemblies would include controllers, circuitry, motors and sensors for operating and monitoring the delivery of the laser beam, an optics assembly for shaping and focusing the laser beam, a beam aiming and directing assembly for precisely directing the laser beam to a predetermined location within the borehole and in a predetermined orientation with respect to the axis 871 of the laser sub 870, the beam aiming and directing system may also contain a beam path verification system to make certain that the laser beam has a free path to the casing wall or structure to be perforated and does not inadvertently cut through a second string or other structure located within the casing, a laser cutting head which is operably associated with, or includes, in whole or in part, the optics assembly and the beam aiming and directing assembly components, a laser beam launch opening 811, and an end cone 812. The laser sub 870 may also contain a roller section or other section to assist in the movement of the tool through the borehole.

Subassemblies and systems for orienting a tool in a well may include for example, gravity based systems such as those disclosed and taught in U.S. Pat. Nos. 4,410,051, 4,637,478, 5,101,964, and 5,211,714, the entire disclosures of each of which are incorporated herein by reference, laser gyroscopes, gyroscopes, fiber gyros, fiber gravimeter, and other devices and system known to the art for deterring true vertical in a borehole.

The laser head in the laser sub 870 has an angled fluid jet nozzle 860. In FIG. 8A, which is a cross section along line A-A of FIG. 8, it is shown how the angled fluid jet nozzle 860 directs the fluid jet 861 toward the laser jet 862, which jet is a $D_2O$ jet). The laser beam path within the $D_2O$ jet 862 is shown by dashed line 863. Thus, the angled jet 861, and in whole or in part the laser jet 861, assists in clearing the perforation hole of debris as the perforation hole is advanced deeper into the formation. The angled 861 may also be $D_2O$, but preferably is some other fluid.

Example 8

Figure 9:
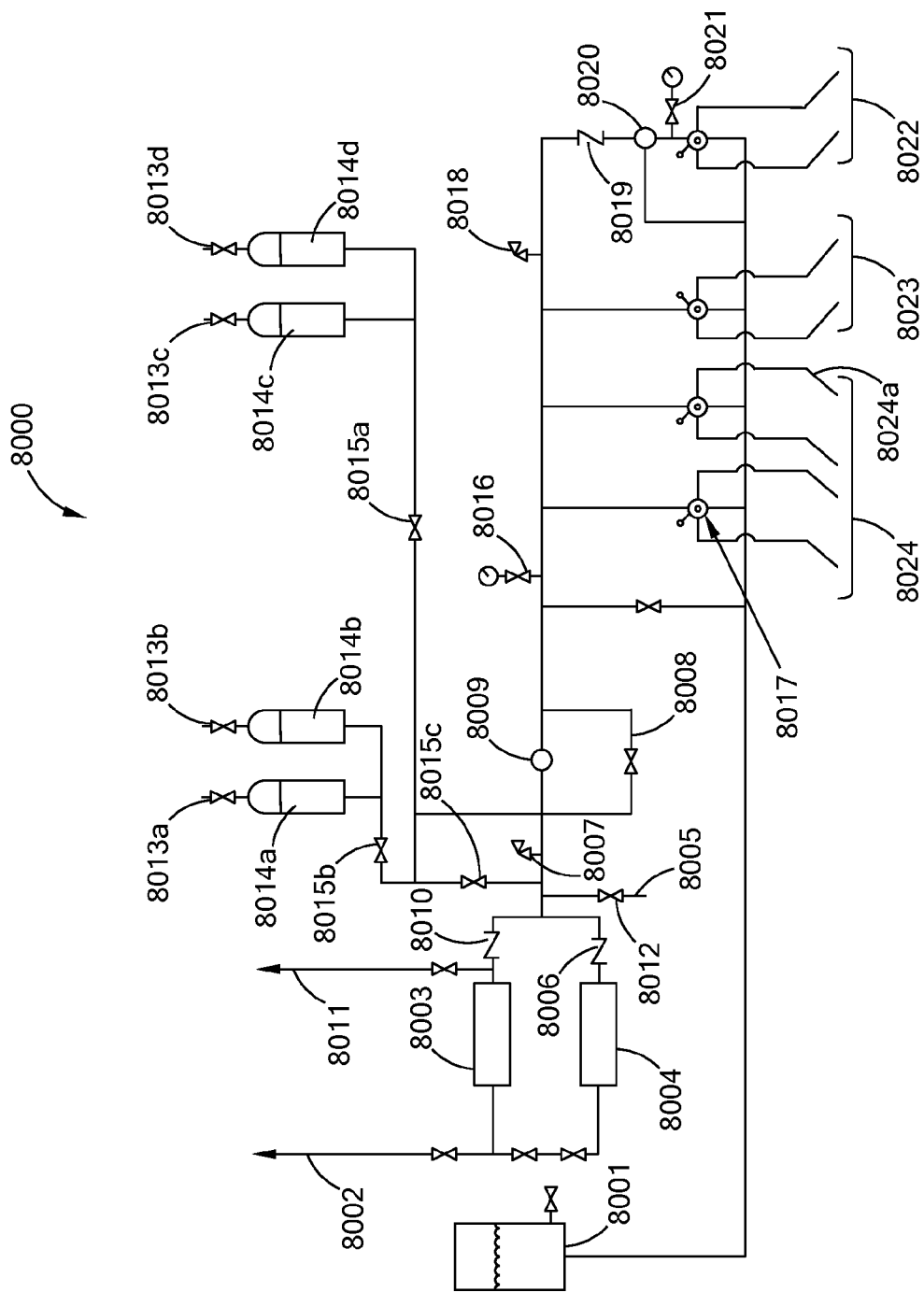
FIG. 9 is a schematic diagram of an accumulator system for use in accordance with the present invention.
Figure 10:
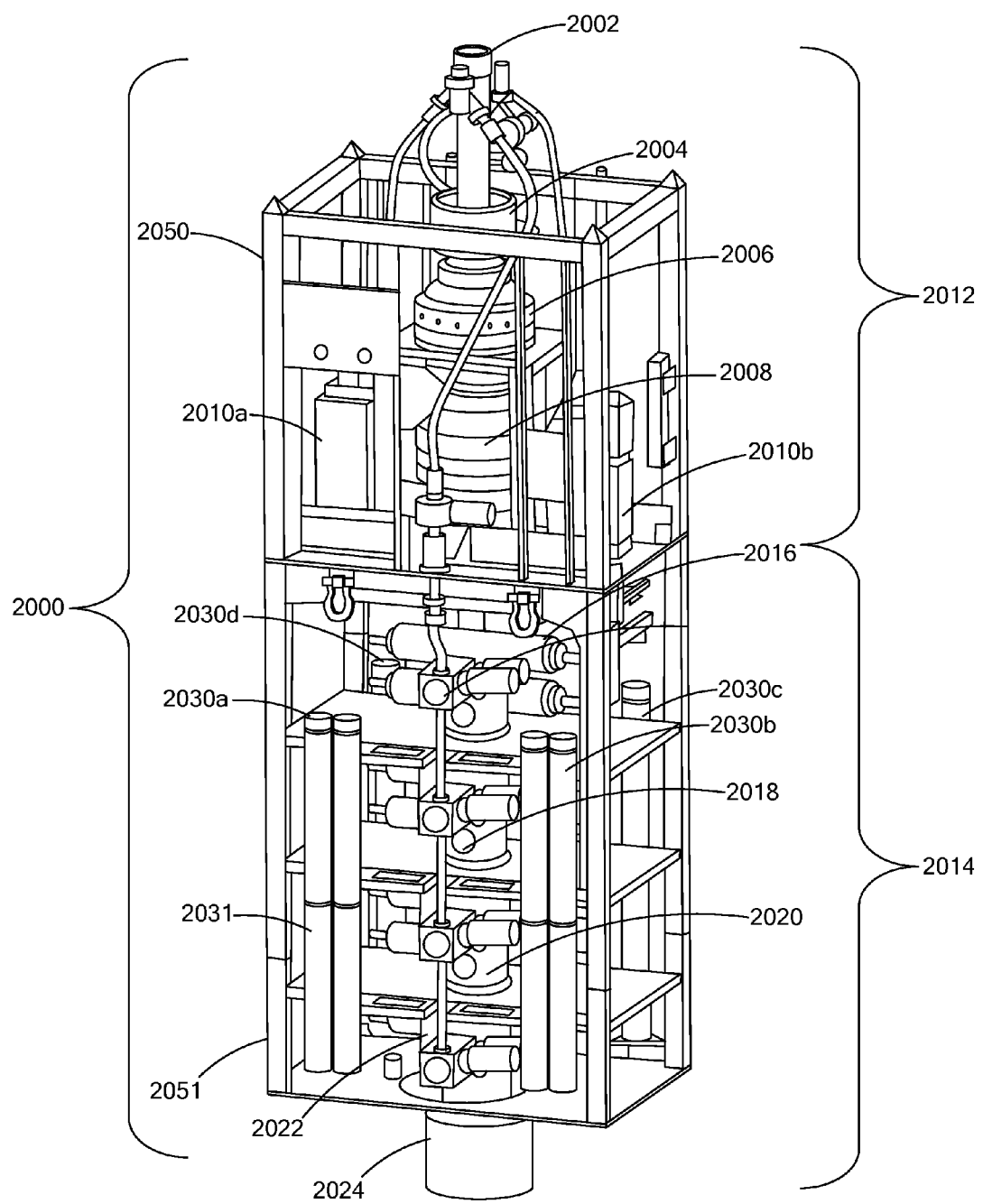
FIG. 10 is a perspective view of an embodiment of a laser BOP stack for use in accordance with the present invention.
Figure 11:
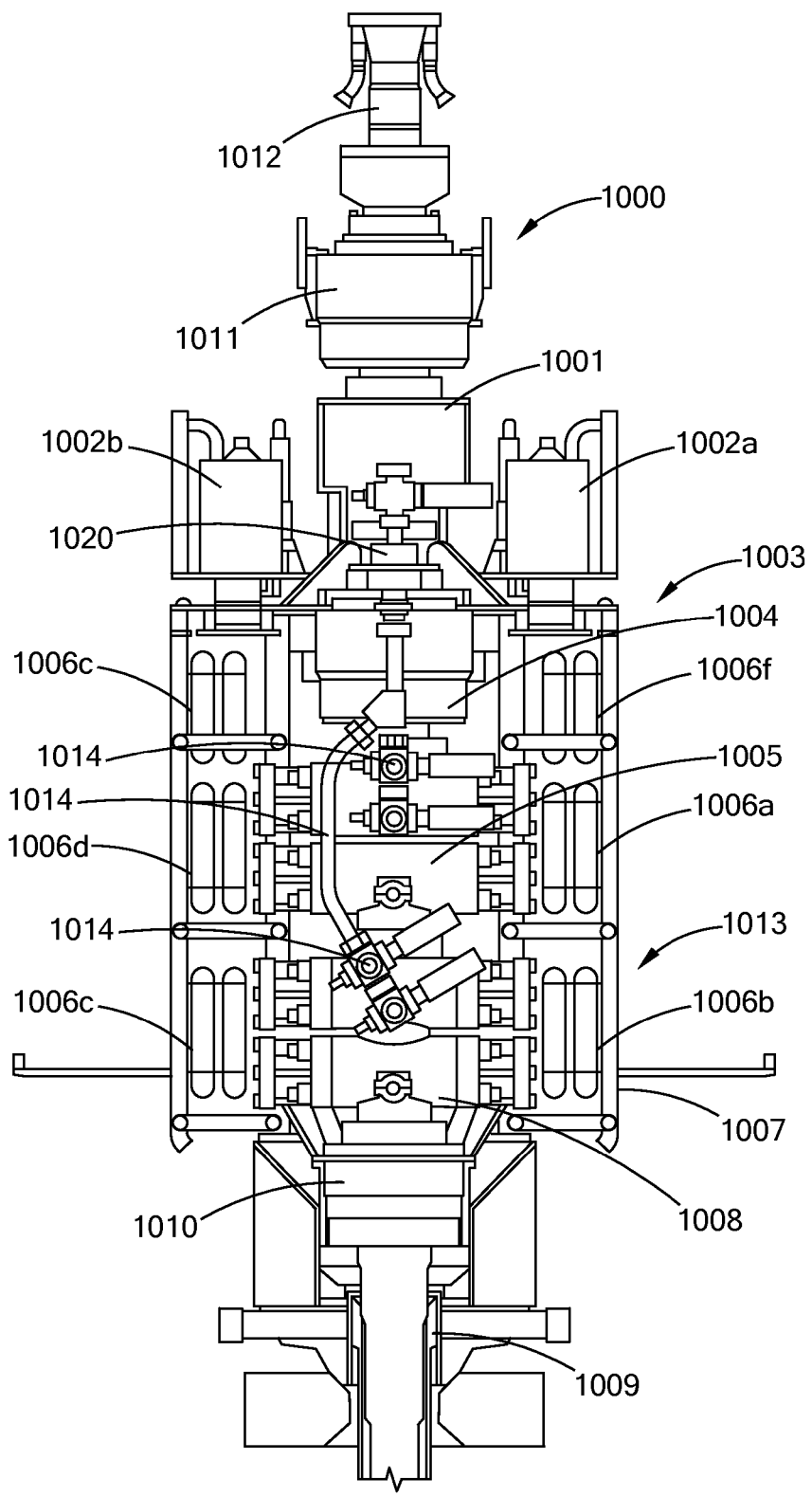
FIG. 11 is a perspective view of an embodiment of a laser BOP stack for use in accordance with the present invention.

Turning to FIGS. 9, 10 and 11 there is provided embodiments of laser BOP systems, which can utilize the $D_2O$ beam path of the present invention. These embodiments are of the type taught and disclosed in U.S. patent application Ser. No. 14/015,003, the entire disclosure of which is incorporated herein by reference.

Turning to FIG. 9 there is provided a schematic diagram of an embodiment of an accumulator system 8000 for providing potential energy to a BOP stack for use as, conversion into, mechanical energy, through the actuation of rams, in conjunction with a laser ram BOP system. Thus, in this embodiment the system 8000 has accumulator banks 8014a, 8014b, 8014c, 8014d, which have pre-charge valves 8013a, 8013b, 8013c, 8013d respectively associated with the accumulator banks. The accumulator banks are connected through tubing having full open valves 8015a, 8015b, 8015c, which in turn are in fluid communication through tubing with relief valve 8007, pressure regulator 8009 (e.g., 1,800-3,000 psi), and a regulator by-pass 8008. There is then a valve and gauge 8016, and a relief valve 8018, which are located along the tubing which connects to the BOP rams 8024, to the laser shear ram 8024a, to the choke 8023, and to the annular BOP 8022. Four way valves, e.g., 8017, are associated with the rams, choke and annular. There is also associated and in fluid communication via tubing and valves in the system a check valve 8019, a pressure regulator 8020 (e.g., 0-1,500 psi, 0-10.3 Mpa), and a valve and gauge 8021. The system 8000 also has a fluid reservoir 8001; two pumps 8003, 8004, which are associated via tubing with a test fluid line 8002, a BOP test line or connection for another pump 8011, a check valve 8010, a check valve 8012, a connector for another pump 8005. The accumulator bank may further be used to provide pressure to a $D_2O$ reservoir, or additional pressure delivery devices may be used to provide a force to propel the $D_2O$ laser jet, or to otherwise form a $D_2O$ laser beam path.

Turning to FIG. 10 there is shown a perspective view of an embodiment of a laser BOP stack. The laser BOP stack 2000 has a lower marine riser package (("LMRP") 2012 that has a frame 2050 and a lower BOP section 2014 having a frame 2051. The LMRP 2012 has a riser adapter 2002, a flex joint 2004, an upper annular preventer 2006, and a lower annular preventer 2008. The frame 2050 of the LMRP 2012 supports a first control module or pod 2010a and a second control module or pod 2010b.

When deployed sub-sea, e.g., on the floor of the sea bed, each pod would be connected to, or a part of, a multiplexed electro-hydraulic (MUX) control system. An umbilical, not shown would transmit for example, control signals, electronic power, hydraulics, fluids, e.g., $D_2O$ for laser jets and high power laser beams from the surface to the BOP stack 2000. The pods control (independently, in conjunction with control signals from the surface and combinations thereof) among other things, the operation of the various rams, and the valves in the choke and kill lines. Preferably, however, a $D_2O$ reservoir that is pressurized or has a pump, or other means, to deliver the required pressures and flow rates to form a $D_2O$ laser beam path, and preferably a $D_2O$ laser beam jet(s), is located on, e.g., within, the stack 2000.

The choke and kill lines provide, among other things, the ability to add fluid, at high pressure and volume if need, such as heavy drilling mud, and to do so in relation to specific locations with respect to ram placement in the stack. These lines also provide the ability to bleed off or otherwise manage extra pressure that may be present in the well. They may also be utilized to handle any excess pressure or fluid volume that is associated with the use of a directed energy delivery device, such as a laser jet, a water jet, or a shaped explosive charge.

The lower BOP section 2014 of the BOP stack 2000 has a double ram BOP 2016, a laser double ram BOP 2018 having a $D_2O$ jet(s) assembly, a double ram BOP 2020, a single ram BOP 2022, and a wellhead connector 2024. The lower BOP section 2014 has associated with its frame 2051 four banks of accumulators 2030a, 2030b, 2030c, 2030d, with each bank having two depth compensated accumulators, e.g., 2031. The depth compensated accumulators, and the accumulator banks, may be pressurized to a $P_{max}$ of at least about 1,000 psi, at least about 3,000 psi, at least about 5,000 psi, and at least about 6,000 psi, about 7,500 psi and more. The pressurized, or charged as they may then be referred to, accumulators provide a source of stored energy, i.e., potential energy, that is converted into mechanical energy upon their discharge to, for example, close the rams in a BOP. The laser ram may be located at other positions in the BOP stack, including either or both of the top two positions in the stack, and additional laser BOPs may also be utilized.

Turning to FIG. 11 there is provided a schematic side view of an embodiment of a laser-mechanical BOP stack. The BOP stack 1003 has an upper section 1000, and a lower section 1013. The upper section 1000 has a flex joint 1012 for connecting to the riser (not shown in this figure), an annular preventer 1011, a collet connector 1001, a first control pod 1002a, a second control pod 1002b, and a choke and kill line connector 1020 (a second choke and kill line connector associated with the second control pod 1002b is on the back side of BOP stack 1003, and is thus not shown in this figure). The first choke and kill lines 1014 extend from the connector 1020 in to the lower section 1013. The lower section 1013 has an annular preventer 1004, double ram 1005 BOP, and a laser double ram BOP 1008, that has a $D_2O$ laser path, e.g., laser jet, assembly associated with it. The lower section 1013 also has a plurality of accumulators, schematically shown in the drawing as two accumulators each in several accumulator banks, e.g., 1006*a*, 1006*b*, 1006*c*, 1006*d*, 1006*e*, 1006*f*. The lower section 1013 also has a wellhead connector 1010 that is shown attached to the wellhead 1009. The accumulator banks, e.g., 1006*a*, 1006*b*, 1006*c*, 1006*d*, 1006*e*, 1006*f*, are positioned on a frame 1007 that is associated with the lower section 1013. The laser ram may be located at other positions in the BOP stack, including either or both of the top two positions in the stack, and additional laser BOPs may also be utilized.

In an example of a closing and venting operation for the BOP of the embodiment of FIG. 11, the annular preventer 1004 may be closed around the drill pipe or other tubular located within the BOP cavity. The laser shear ram may be operated, the laser D2O jet(s) would be fired providing for the delivery of the laser beam(s) in the $D_2O$ fluid paths created by the $D_2O$ jet(s), and closed cutting and then severing the drill pipe and sealing the well. During the laser cutting operation $D_2O$ from the laser cutting jet may be vented through the choke line, which is then closed upon, or after the sealing, of the shear ram blocks.

The lasers may be located sub-sea on for example the BOP stack, above the surface, or both. The source of the D2O for the laser fluid jet may be sub-sea, above the surface (and delivered by flow line) or both. Preferably, a $D_2O$ reservoir that is pressurized or has a pump, or other means, to deliver the required pressures and flow rates to form a $D_2O$ laser beam path, under the operating pressures, e.g., rates emergency pressures, within the BOP cavity, is located on, e.g., within, the BOP. The $D_2O$ reservoir should contain a sufficient volume of $D_2O$ to provide for all anticipated uses and emergency situation, and may further have the ability to be refilled via a surface line, or other means.

Example 9

Figure 12:
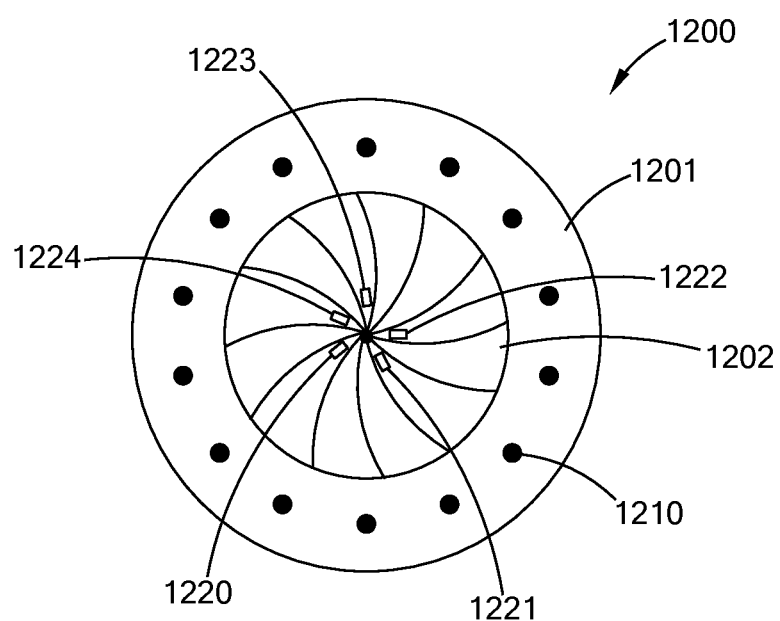
FIG. 12 is a plan view of an embodiment of a laser iris cutting assembly for use in accordance with the present inventions.

Turning to FIG. 12 there is provided a plan view of an embodiment of a laser cutting iris assembly 1200. The assembly 1200 has a support 1201, e.g., a ring, or flange, having securing members 1210, e.g., bolts and nuts.

The assembly may be used in unpressurized environments, such as in an open air environment, cutting a pipe that is placed in the iris opening. However, the assembly 1210 may find preferred benefits for use in pressure containment structures, vessels or systems. In this manner the support 1201 can be a part of, e.g., bolted into, attached to, integral with, the pressure containment systems, with the iris and iris opening being a part of any pressure containment cavity that the pressure containment systems forms. For example, the assembly 1200 could be incorporated into a pressure containment device for use in the oil field, such as a gate valve, well head or BOP.

Associated with the support 1201 are a number of iris blades, e.g., 1202. There may be from 2 to 10 or more blades. In FIG. 12 the blades, e.g., 1202 are completely closed, and thus the iris opening is not shown. Laser cutters 1220, 1221, 1222, 1223, and 1224 are located near the lead ends of the blades. In this manner as the iris is closed the tubular in the iris opening will be centered, and the laser cutters will be kept a consistent distance from the tubular as the iris closes and the laser cutters deliver their laser beams. Although any laser fluid for the cutters may be used, preferably, the laser beams are delivered in $D_2O$ laser beam paths, that are provided by $D_2O$ fluid jets.

The laser cutters may also be positioned so that their laser beam paths are facing outwardly from the center or opening of the iris, e.g., the laser beams are firing outwardly instead of inwardly. In this manner when going from a closed position to an open position, the iris will move the laser cutters outwardly, and for example, closer to an inner wall of a tubular to be cut or perforated.

Example 10

Figure 13A:
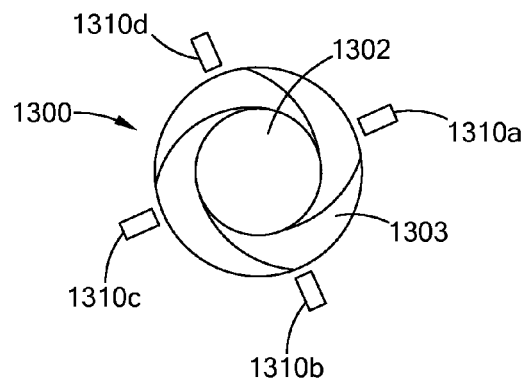
FIGS. 13A, 13B and 13C are plan snap shot views of an embodiment of a laser cutting iris assembly closing for use in accordance with the present inventions.
Figure 13B:
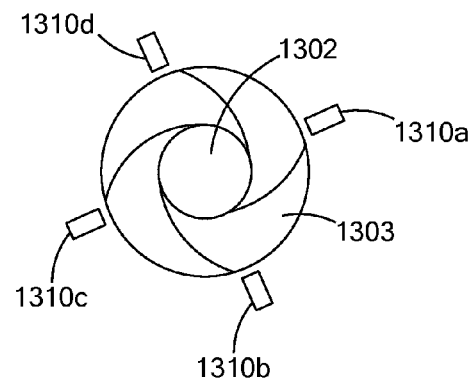
Figure 13C:
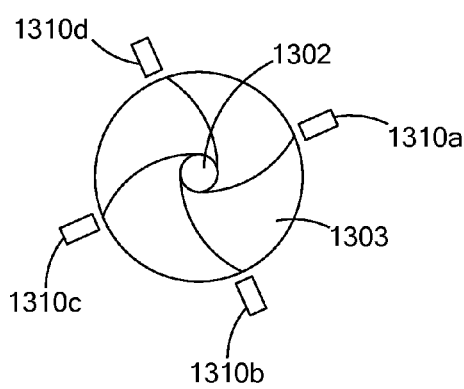

Turning to FIGS. 13A to 13C there is shown plan snap shot views of a laser iris assembly closing 1300. In this embodiment the laser cutters 1310*a*, 1310*b*, 1310*c*, 1310*d* are located out side of the iris blades, e.g., 1303. FIG. 13A shows the iris blades. e.g., 1303, in the open position and the iris cavity 1302 at its largest diameter. FIG. 13B is a snap shot of the iris blades, e.g., 1303, partially closed, resulting in a reduction in the size of the iris diameter 1302. FIG. 13C shows the iris blades, e.g., 1303 almost entirely closed, as if for example they were holding a drilling pipe. In FIG. 13C the iris opening 1302 is almost completely closed. Although any laser fluid for the cutters may be used, preferably, the laser beams are delivered in $D_2O$ laser beam paths, that are provided by $D_2O$ fluid jets.

The various embodiments of deuterium oxide ($D_2O$) laser fluid jets and laser beam paths may be used with various high power laser systems, tools, devices, and conveyance structures and systems. For example, embodiments of deuterium oxide laser fluid jets may use, or be used in, or with, the systems, lasers, tools and methods disclosed and taught in the following US patent applications and patent application publications: Publication No. 2010/0044106; Publication No. 2010/0215326; Publication No. 2012/0275159; Publication No. 2010/0044103; Publication No. 2012/0267168; Publication No. 2012/0020631; Publication No. 2013/0011102; Publication No. 2012/0217018; Publication No. 2012/0217015; Publication No. 2012/0255933; Publication No. 2012/0074110; Publication No. 2012/0068086; Publication No. 2012/0273470; Publication No. 2012/0067643; Publication No. 2012/0266803; Publication No. 2012/0217019; Publication No. 2012/0217017; Publication No. 2012/0217018; Ser. No. 13/768,149; Ser. No. 13/782,869; Ser. No. 13/222,931; Ser. No. 14/139,680; and Ser. No. 14/080,722, the entire disclosure of each of which are incorporated herein by reference.

These various embodiments of systems and methods for using $D_2O$ laser beam paths and jets set forth in this specification may be used with other high power laser systems that may be developed in the future, or with existing non-high power laser systems, which may be modified in-part based on the teachings of this specification, to create a laser system. These various embodiments of systems and methods for using $D_2O$ laser beam paths and jets may also be used with other devices and systems that may be developed in the future, or with existing devices and systems, which may be modified in-part based on the teachings of this specification to provide for the utilization of $D_2O$ as provided for in this specification. Further, the various apparatus, configurations, and other equipment set forth in this specification may be used with other, high power laser systems, laser delivery assemblies, connectors, optics and combinations and variations of these. The structures, equipment, apparatus, and systems provided in the various Figures and Examples of this specification may be used with each other and the scope of protection afforded the present inventions should not be limited to a particular embodiment, configuration or arrangement that is set forth in a particular embodiment in a particular Figure or Example.

The inventions may be embodied in other forms than those specifically disclosed herein without departing from its spirit or essential characteristics. The described embodiments are to be considered in all respects only as illustrative and not restrictive.

What is claimed is:

1. A high power laser fluid jet nozzle assembly comprising:
   a body comprising:
      a laser fluid jet nozzle; and
      an optics assembly configured to deliver a high power laser beam along a laser beam path into the laser fluid jet nozzle; and
   a source of deuterium oxide in fluid communication with the laser fluid jet nozzle for forming a pressurized liquid deuterium oxide jet, the source having a pressure of at least 3,000 psi,
   wherein the laser beam path is in the pressurized liquid deuterium oxide jet and wherein the pressurized liquid deuterium oxide jet propagates from the laser fluid jet nozzle to a target material to perform a laser operation,
   wherein the high power laser beam has a power of at least 10 kW, and
   wherein the pressurized liquid deuterium oxide jet creates a volume that has a length greater than 5 inches.

2. The laser fluid jet of claim 1, wherein the body is associated with a mechanical cutting device.

3. The laser fluid jet of claim 2, wherein the mechanical cutting device comprises an iris.

4. The laser fluid jet of claim 1, wherein the body is a part of a downhole tool.

5. The laser fluid jet of claim 4, wherein the downhole tool is selected from the group comprising a perforating tool, a hydraulic fracturing tool, a milling tool, a window cutting tool and a pipe cutting tool.

6. The system of claim 1, wherein the length of the jet is at least about 10 inch.

7. The system of claim 1, wherein the jet is within a pressure containment cavity of a pressure containment vessel.

8. The system of claim 7, wherein the volume is within a pressure containment cavity of a pressure containment vessel.

9. The system of claim 8, wherein the laser beam has a wavelength that less than about 1250 nm.

10. The system of claim 7, wherein the laser beam has a wavelength that is less than about 1250 nm.

11. The system of claim 7, wherein the pressure is greater than 5,000 psi.

12. The system of claim 1, wherein the laser beam has a wavelength that is less than about 1250 nm.

13. The system of claim 1, wherein the pressure is greater than 3,000 psi.

14. The system of claim 1, wherein the pressure is greater than 5,000 psi.

15. A method comprising:
   providing a high power laser fluid jet nozzle assembly comprising a jet nozzle and an optics assembly configured to deliver a high power laser beam;
   forming a pressurized liquid deuterium oxide jet using the jet nozzle, wherein the jet nozzle is in fluid communication with a source of deuterium oxide;
   delivering the high power laser beam along a laser beam path;
   propagating the pressurized liquid deuterium oxide jet from the jet nozzle to a target material; and
   propagating the high power laser beam through the pressurized liquid deuterium oxide jet and striking the target material to perform a laser operation on the target material,
   wherein the high power laser beam has a power of at least 5 kW, and
   wherein the pressurized liquid deuterium oxide jet creates a volume that has a length greater than 1 inches.

16. The method of claim 15, wherein the high power laser beam has a wavelength of less than about 1250 nm.

17. The method of claim 15, wherein the high power laser beam has a wavelength of about 1070 nm.

18. The method of claim 15, wherein the target material is a drilling pipe.

19. The method of claim 15, wherein the target material is a tubular member.

20. The method of claim 19, wherein the pressured liquid deuterium oxide jet has a pressure greater than 3,000 psi.

21. The method of claim 20, wherein the length is greater than 5 inches.

22. The method of claim 19, wherein the pressured liquid deuterium oxide jet has a pressure greater than 5,000 psi.

23. The method of claim 15, wherein the laser beam propagates through a space within a pressure containment cavity of a pressure containment structure.

24. The method of claim 23, wherein the pressured liquid deuterium oxide jet has a pressure greater than 3,000 psi.

25. The method of claim 24, wherein the length is greater than 5 inches.

26. The method of claim 23, wherein the pressured liquid deuterium oxide jet has a pressure greater than 5,000 psi.

27. The method of claim 15, wherein the pressured liquid deuterium oxide jet has a pressure greater than 1,000 psi.

28. The method of claim 27, wherein the length is greater than 5 inches.

29. The method of claim 15, wherein the pressured liquid deuterium oxide jet has a pressure greater than 5,000 psi.

30. The method of claim 15, wherein the length is greater than 5 inches.

31. A high power laser fluid jet nozzle assembly comprising:
   a body comprising:
      a laser fluid jet nozzle; and
      an optics assembly configured to deliver a high power laser beam, having a power of at least 5 kW along a laser beam path into the laser fluid jet nozzle; and
   a pressurized source of liquid deuterium oxide, having the capability to provide a pressure of at least about 5,000 psi, in fluid communication with the laser fluid jet nozzle for forming a pressurized liquid deuterium oxide jet,
   wherein the laser beam path is in the pressurized liquid deuterium oxide jet and wherein the pressurized liquid deuterium oxide jet propagates from the laser fluid jet nozzle to a target material to perform a laser operation,
   wherein the high power laser beam has a power of at least 10 kW, and
   wherein the pressurized liquid deuterium oxide jet creates a volume that has a length greater than 1 inch.

* * * * *